(12) United States Patent
Johnson, IV

(10) Patent No.: US 7,007,761 B1
(45) Date of Patent: Mar. 7, 2006

(54) EMERGENCY RESPONSE VEHICLE

(76) Inventor: John J. Johnson, IV, P.O. Box 1322, Edgewood, NM (US) 87015

( * ) Notice: Subject to any disclaimer, the term of this patent is extended or adjusted under 35 U.S.C. 154(b) by 0 days.

(21) Appl. No.: 09/574,637

(22) Filed: May 18, 2000

Related U.S. Application Data

(60) Provisional application No. 60/135,251, filed on May 21, 1999.

(51) Int. Cl.
  *B05B 12/14* (2006.01)
  *A24F 25/00* (2006.01)
(52) U.S. Cl. ............................. 169/24; 169/44; 169/46; 169/53; 169/52
(58) Field of Classification Search ................. 169/24, 169/44, 46, 53, 52, 67, 14, 30; 239/171, 239/172, 173, 162, 271, 272; 296/185, 188; 180/9.1, 9.28, 9.3
  See application file for complete search history.

(56) References Cited

U.S. PATENT DOCUMENTS

| | | | | |
|---|---|---|---|---|
| D114,112 S | * | 4/1939 | Albertson et al. ........... D15/23 |
| 2,246,616 A | | 6/1941 | Cherry | |
| D139,635 S | * | 12/1944 | Walker ........................ D15/23 |
| D148,040 S | * | 12/1947 | Steel ........................... D15/23 |
| D211,569 S | * | 7/1968 | Rickel et al. ................ D15/23 |
| 3,586,236 A | * | 6/1971 | Schaffler ..................... 239/172 |
| 3,749,175 A | * | 7/1973 | Bower ....................... 169/31 P |
| 4,231,444 A | * | 11/1980 | Telesio ....................... 180/294 |
| 4,359,127 A | * | 11/1982 | Arnold ....................... 180/252 |
| 4,425,978 A | * | 1/1984 | Star ........................... 180/243 |
| 4,461,202 A | | 7/1984 | Appelblatt et al. | |
| 4,593,855 A | * | 6/1986 | Forsyth ....................... 239/74 |
| 4,678,041 A | | 7/1987 | Staudinger | |
| 4,823,895 A | | 4/1989 | Kimball | |
| 4,830,421 A | | 5/1989 | Hawelka et al. | |
| 4,913,253 A | | 4/1990 | Bowling | |
| 4,973,082 A | * | 11/1990 | Kincheloe ................... 280/756 |
| 5,061,748 A | * | 10/1991 | Bolton et al. ............... 524/827 |
| 5,125,764 A | * | 6/1992 | Veath, Sr. ................... 404/108 |
| 5,307,725 A | | 5/1994 | Desmond et al. | |
| 5,325,933 A | * | 7/1994 | Matsushita ................. 180/6.7 |
| 5,476,146 A | | 12/1995 | Brown | |
| 5,511,599 A | * | 4/1996 | Willard, Jr. ................. 152/454 |

(Continued)

FOREIGN PATENT DOCUMENTS

RU    2055614 C1  *  3/1996

*Primary Examiner*—Davis Hwu
(74) *Attorney, Agent, or Firm*—Deborah A. Peacock; vidal A. Oaxaca; Peacock Myers, P.C.

(57) ABSTRACT

A small emergency response vehicle having a wedge-shaped nose and triangular wheel base for improved accessibility to emergency sites previously inaccessible to conventional fire fighting vehicles. A main overhead tank and two modular auxiliary tanks provide 2400 liters of storage for water and/or surfactants. The front wheel provides a 360 degree turning radius. The vehicle can be air-lifted and air-dropped with a helicopter via attachment points on the heavy steel frame. An enclosed cab has a fire and impact resistant glass windshields and an air supply to the driver as well as to occupants in the tank compartment, when the tank is removed. A nozzle assembly is mounted on the nose of the vehicle to distribute the fire suppression materials.

66 Claims, 21 Drawing Sheets

U.S. PATENT DOCUMENTS

| | | | |
|---|---|---|---|
| 5,855,386 A * | 1/1999 | Atkins | 280/124.111 |
| 5,954,364 A | 9/1999 | Nechushtan | |
| 6,000,485 A | 12/1999 | Falk | |
| 6,029,750 A * | 2/2000 | Carrier | 169/52 |
| 6,089,252 A | 7/2000 | Braun | |
| 6,182,784 B1 * | 2/2001 | Pestotnik | 180/376 |
| 6,289,995 B1 * | 9/2001 | Fuller | 169/52 |

\* cited by examiner

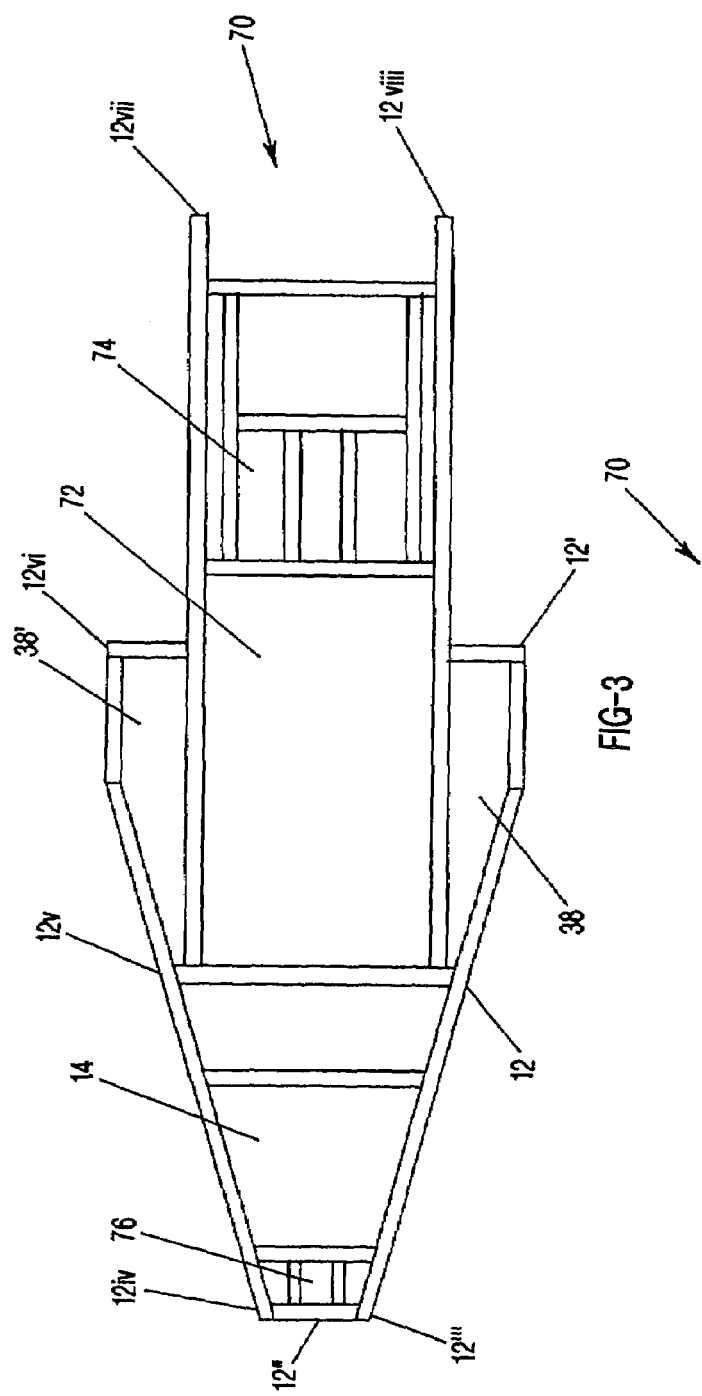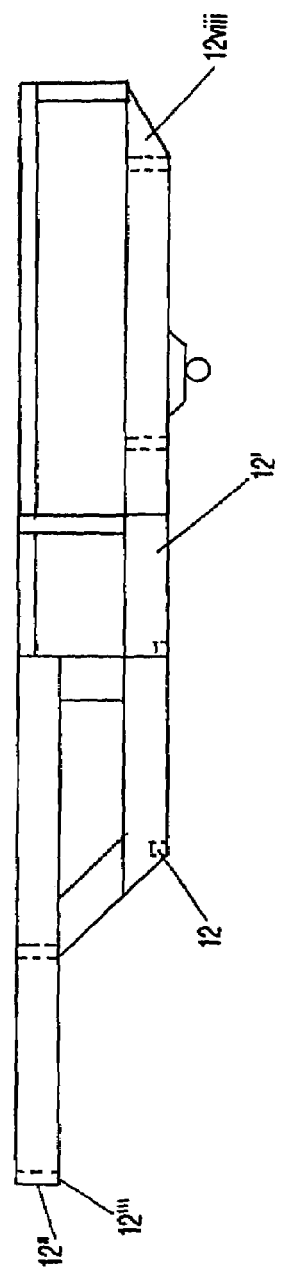

EMERGENCY RESPONSE VEHICLE

CROSS-REFERENCE TO RELATED APPLICATIONS

This application claims the benefit of the filing of U.S. Provisional Patent Application Ser. No. 60/135,251 entitled "Emergency Response Vehicle and Mobile Equipment Platform", filed on May 21, 1999, and the specification thereof is incorporated herein by reference.

BACKGROUND OF THE INVENTION

1. Field of the Invention (Technical Field):

The present invention relates to emergency response vehicles, in particular to a small, maneuverable, motorized (combustible fuel and/or electrical) vehicle for transporting and spreading water and/or fire-fighting substances, such as, but not limited to, liquid, powder, foam, gas and/or gel, that is particularly useful for quick response to fires in situations where larger and more cumbersome traditional fire-fighting vehicles cannot gain access.

2. Background Art

Fires are an ever-present threat to forests, buildings, homes and a variety of structures. Fires can also occur on bodies of water, such as when chemicals or oil have accumulated in them. Electrical fires and hazardous materials present further fire-fighting challenges in containing and eliminating the fire. One of the most difficult aspects of fighting a fire is accessibility. Remote areas deep within forests and narrow alleyways leading to secluded portions of buildings are examples of areas where prior art fire-fighting vehicles either have extreme difficulty accessing or cannot access at all due to their large heavy size and cumbersome nature. Additionally, areas that are largely surrounded by fire where victims may be trapped are inaccessible to prior art fire-fighting vehicles.

In order to access these types of areas, fire-fighting personnel themselves proceed on foot and sometimes get near extremely dangerous flames and high-heat areas in order to contain and eliminate fires, and rescue victims, thereby putting themselves in danger. These individuals have a limited ability to carry fire-fighting equipment to the area of interest and it is also highly difficult to replenish their supplies. In forest fire situations, fire fighters are often not allowed nor able to proceed near the target area but are instead required to stay a distance away from the fire. In these instances they often start "back" fires and clear areas for larger equipment and vehicles to pass through, thereby allowing the fire to consume large areas before being contained or eliminated.

Prior art fire-fighting vehicles typically carry water in large tanks, hoses, and pumps for distributing the water and/or fire-fighting powders, foams, gases, and/or gels onto the affected areas. However, even the smaller vehicles, such as four-wheel drive and all-terrain vehicles that have been equipped with tanks, pumps and hoses, are limited in their ability to access areas secluded by rough terrain or narrow clearance. The technology currently available is largely designed to fight fires in areas having sophisticated infrastructure, such as in cities with wide and level streets, that do not require the vehicle to be highly maneuverable, making tight turns and progressing over rough terrain.

Furthermore, prior art fire-fighting vehicles are not equipped for additional features that are critical in fire-fighting situations, such as the ability to carry in a crew of fire-fighting individuals; transport vast quantities of water, powder, foam, gas, and/or gel; carry out victims; protect the fire-fighters who are operating the vehicle; and in particular, they are not equipped for efficient maintenance of the vehicle and equipment on the scene or for fast and easy replenishment of supplies. Prior art vehicles are further not equipped to respond to a variety of emergency situations in addition to fires; for example, the ability to move through crowds in riot situations, protecting the occupants of the vehicle and providing crowd control with a water stream.

U.S. Pat. No. 5,476,146 to Brown, entitled "Fire Fighting All Terrain Vehicle," discloses an example of prior art vehicles that have been developed in an attempt to address this need for improved accessibility to fires. Brown describes an all-terrain vehicle having two tanks, at least four wheels, an improved turning radius, small size, and improved accessibility over rough terrain. However, Brown does not address those critical additional needs set forth above.

The present invention overcomes the limitations of prior art fire-fighting vehicles and provides a variety of critical features making it an all-purpose and highly functional piece of equipment.

SUMMARY OF THE INVENTION (DISCLOSURE OF THE INVENTION)

The present invention comprises an emergency response vehicle comprising a wedge-shaped and/or cone-shaped nose, which facilitates access to areas that are inaccessible or not easily accessed by traditional emergency response vehicles, such as, but not limited to, fire trucks, ambulances and the like. In a preferred embodiment, the vehicle of the present invention comprises at least three wheels forming, for example, a triangular wheel base. Of course, according to the present invention, a triangular wheel base optionally comprises more than three wheels, for example, double wheels. Likewise, the present invention optionally comprises wheel bases other than triangular wheel bases, for example, but not limited to a polygonal wheel base comprising a polygon comprising more than three sides. In embodiments comprising wheels, the vehicle preferably comprises runflat tires on at least one of the wheels. The vehicle preferably comprises at least one front wheel comprising an ability to rotate 360 degrees about an axis substantially orthogonal to the axis of wheel rotation for translational movement of the vehicle, and a leaf spring nose suspension and/or a leaf spring suspension for a front mounted support, such as, but not limited to, a wheel, a track, and/or a ski. In a preferred embodiment, the vehicle comprises a triangular wheel base comprising a front wheel beneath a wedge-shaped nose, and two rear wheels, each located on opposite sides of the rear of the vehicle. The vehicle preferably comprises at least one brake for braking the movement of at least one wheel and/or track, a mechanical, electromagnetic, pneumatic, and/or hydraulic braking system. The vehicle preferably comprises at least two separately controllable brakes, for example, but not limited to, separately controllable left and right brakes and/or front and rear brakes. Of course, concerted, traction control and/or antilocking braking systems are within the scope of the present invention. The vehicle preferably comprises at least one tank and at least one engine and/or at least one motor.

The vehicle of the present invention optionally comprises at least one retractable crew and/or litter rack. In a preferred embodiment, the vehicle comprises a cab for at least one driver and/or at least one radiation resistant and/or reflective window, such as, but not limited to, a fire and impact resistant windshield.

According to a preferred embodiment, the vehicle comprises at least one engine selected from the group consisting of gasoline engines, diesel engines, air-cooled gasoline engines, air-cooled diesel engines, electrical motors and shielded electrical motors. The vehicle preferably comprises a steering mechanism comprising, for example, a chain and sprocket steering mechanism. The inventive vehicle also optionally comprises a hydraulic and/or pneumatic system. In embodiments comprising hydraulic and/or pneumatic systems, the vehicle optionally comprises hook-ups for attaching implements to the hydraulic and/or pneumatic systems. For example, in a preferred embodiment, the vehicle optionally powers tools, such as, but not limited to, machine tools, grounds-keeping tools, rescue tools, fire-fighting tools, life-saving tools, and the like.

The vehicle of the present invention preferably comprises compact external dimensions when compared to traditional emergency response vehicles, such as, fire trucks. In a preferred embodiment, the inventive vehicle comprises dimensions of approximately 4.5 meters in length, approximately 1.5 meters in width, and approximately 2 meters in height. The inventive vehicle preferably comprises at least one engine and/or motor comprising connectors that comprise disconnection and connection properties that allow for timely connection and disconnection of components. Such connectors are referred to herein as "quick disconnects," and are not limited to connectors for engines and/or motors because such connectors are useful for other connecting features of the inventive vehicle. In embodiments comprising quick disconnects, removal of at least one engine and/or motor is facilitated. In a preferred embodiment, removal of at least one engine and/or motor is facilitated by mounting the at least one engine and/or motor on a slidable cradle that slides away from the vehicle, completely out of the vehicle and/or to an interior position within the vehicle for rapid maintenance and replacement of the at least one engine and/or motor and/or other components of the vehicle, for example, but not limited to, transmission components. The vehicle preferably comprises at least one crawler track for mobility, such as, but not limited to, a snowmobile track, a military tank track, an earthmoving tractor track, and the like. In such an embodiment, the vehicle comprises at least one crawler track in lieu of or in addition to at least one wheel and/or at least one other mobility device, such as, but not limited to, a ski.

According to a preferred embodiment, the inventive vehicle comprises a tilt-bed, a gimbal, a basket and a robotic arm. In such an embodiment, these four components optionally operate in a cooperative manner to perform tasks, such as, but not limited to, hazardous material disposal, wherein hazardous materials comprises, but is not limited to, bombs, explosives, chemicals, radioactive material, and the like. In an alternative embodiment, the vehicle comprises a vacuum generating mechanism for vacuuming materials, including, for example, hazardous materials.

The vehicle preferably comprises a rigid frame capable of withstanding impacts with obstacles in the path of the vehicle, such obstacles include, but are not limited to, doors, vegetation, walls and/or interior structures of a home and/or industrial building, fallen building debris comprising, for example, roof debris.

According to a preferred embodiment, the vehicle comprises at least one attachment point and preferably a plurality of attachment points located on the vehicle and/or frame suitable for attaching equipment for airlifting and/or air-dropping the vehicle.

The inventive vehicle preferably comprises a fire-fighting vehicle comprising at least one tank for containing a material or component capable of forming fire-suppression foam. In such a preferred embodiment, the capacity of the at least one tank provides for formation of at least approximately one 34,000 liters of fire-suppressing foam. Accordingly, the vehicle optionally comprises a pump for pumping material to and/or from the at least one tank. Alternatively, or in addition to, a pressure or gravity mechanism provides for transfer or material to or from the at least one tank. In a preferred embodiment, the vehicle comprises a main overhead tank and at least one auxiliary tank. In such an embodiment, the at least one auxiliary tank optionally comprises at least one modular auxiliary tank optionally comprising at least one removably attachable hinged connection to the vehicle for rapid removal, filling and/or replacement. In such an embodiment, the vehicle optionally comprises at least one hingedly connected door for access to a main overhead tank and/or at least one auxiliary tank. The vehicle preferably comprises a main overhead tank comprising a capacity of approximately 2250 liters. For delivery of material contained in at least one tank to a position and/or area remote from the vehicle, the present invention comprises at least one delivery mechanism for delivering the material contained in the at least one tank wherein the at least one delivery mechanism comprises, for example, but not limited to, at least one mechanical pump and/or a pressurized vessel. In embodiments where material from at least one tank is mixed with another material, from a tank or other source, the present-invention comprises an eductor for mixing material, for example, for mixing material from a main overhead tank and at least one auxiliary tank. To facilitate installation and/or removal of a main overhead tank, a preferred embodiment of the present invention comprises at least one guide rail on a main overhead tank and at least one guide channel within the vehicle wherein the main overhead tank slides into the at least one guide channel via the at least one guide rail on the tank.

In a preferred embodiment, the vehicle comprises a body supportable on the ground by at least three wheels wherein the body comprises a rigid nose, comprising at least one shape selected from the group consisting of a wedge shape and a cone shape, and a compartment positioned aft of the nose for mounting at least one tank for containing a material; and at least one delivery mechanism for delivering material contained in at least one tank to an area remote from the vehicle wherein the at least one delivery mechanism comprises at least one member selected from the group consisting of a mechanical pump and a pressurized vessel.

A primary object of the present invention is to provide a flexible multipurpose emergency response vehicle primarily for fire fighting, bomb disposal, crowd control, hazardous material removal, rescue and evacuation.

Another primary object of the present invention is that the vehicle is constructed to maximize operational time or "up-time" and minimize "down-time" thereby allowing for the vehicle to be readily operated, maintained and repaired by fire fighting personnel without the need for specialized shop tools and/or specialized diagnostic equipment. Features that facilitate quick pit stops for race cars are within the scope of the present invention.

Another primary object of the present invention is that it be small and compact enough to be flown in by a helicopter and/or descended with aid of a parachute.

Yet another primary object of the present invention is that the capacity to carry a sufficient amount of fire suppression material for a practical amount of coverage.

A primary advantage of the present invention is improved accessibility to remote areas.

Another advantage of the present invention is the ability to transport large quantities of fire suppression materials and equipment.

Still another advantage of the present invention is the ability to transport victims.

Yet another advantage of the present invention is the ability to protect the occupants from the hazards of the exterior environment.

Yet still another advantage of the present invention is the ability to replenish supplies and perform maintenance on-site and at much faster rates than previously possible with prior art technologies.

Another advantage is the ability to work in a team comprising a plurality of vehicles, for example, vehicles in tandem, and/or in concert with conventional equipment thereby extending the capability of conventional equipment.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 2 is a rear perspective view of FIG. 1a;

FIG. 3 is a top view of the frame of the preferred embodiment of the present invention showing attachment points to permit the vehicle to be air-dropped or air-lifted;

FIG. 4 is a side view of FIG. 3;

Figure 1A:
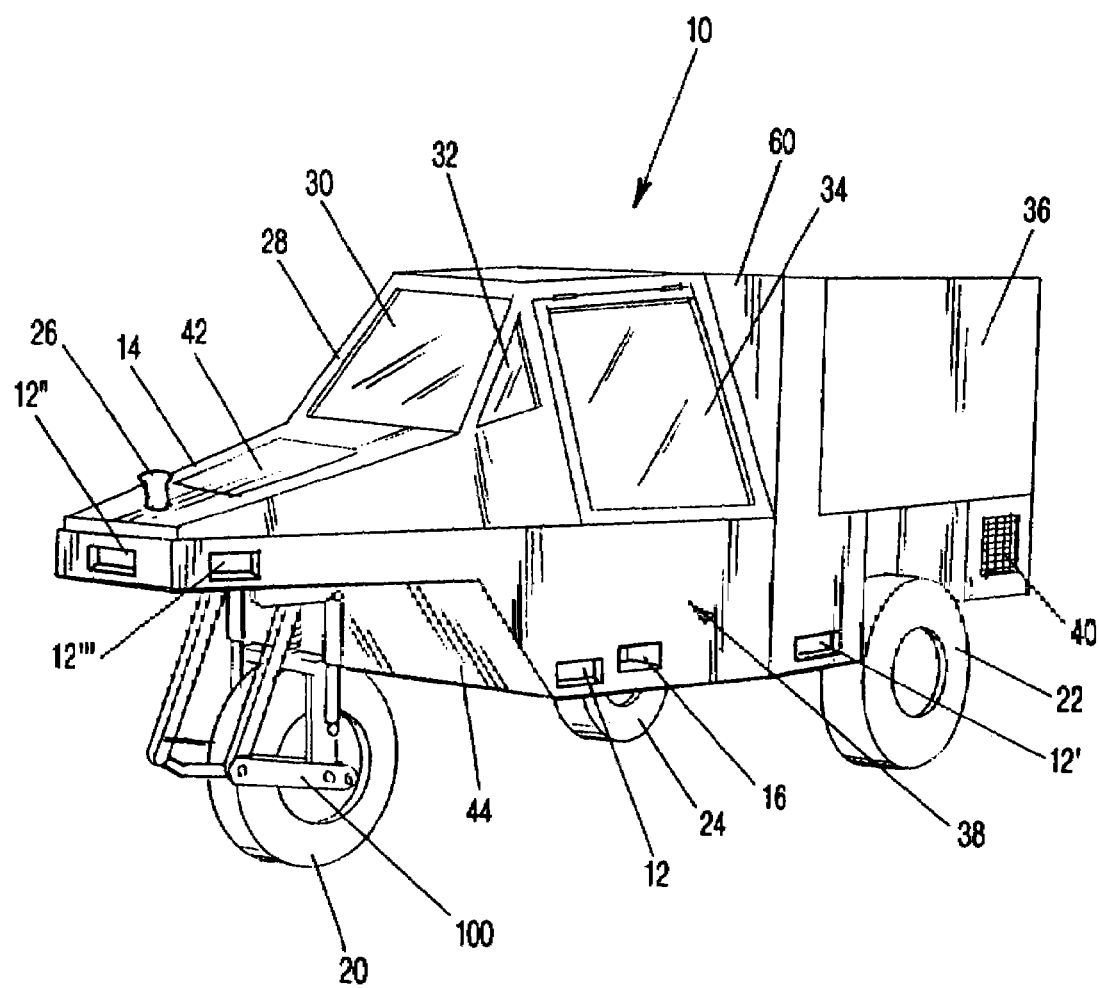
FIG. 1a is a front perspective view of the preferred embodiment of the present invention for a emergency response vehicle showing the wedge-shaped nose.

DESCRIPTION OF THE PREFERRED EMBODIMENTS (BEST MODES FOR CARRYING OUT THE INVENTION)

The present invention is a three-wheeled vehicle enabling a 360 degree nose wheel turning radius, that carries a total of approximately 2400 liters of water, powder, foam, gas, and/or gel for fire-fighting. A wedge-shaped nose improves access though gates, to push automobiles away from its path, to move through brush, and provide the driver with enhanced visibility. Other shapes that achieve the same result are within the scope of the present invention, for example, but not limited to, cone shapes.

In a preferred embodiment of the present invention, fire-fighting materials such as water, powder, foam, gas, and/or gel are contained in one main approximately 2250 liter tank atop the vehicle and two auxiliary approximately 75 liter tanks, each modular and hingedly-mounted on each side of the vehicle for fast replacement. The vehicle optionally comprises oxygen tanks and/or air for the occupants, as well as exterior "fire glass" protecting the occupants driving the vehicle. This additionally enables the vehicle to transport and spread HALON® fire extinguishing agents (registered trademark of Allied Chemical Corporation, Morristown N.J.) and/or dry chemical powder to fight Class C fires. "Runflat" tires are optionally provided, such as those found on military and/high security vehicles, to improve endurance. In a preferred embodiment, tanks (including fuel tanks and/or batteries and/or fuel cells) as well as the engine and/or motor can be removed in a matter of minutes and replaced on-site for fast maintenance and replenishment of supplies. Lifter racks are optionally provided on each side of the vehicle that can be folded up against the sides of the vehicle in a vertical position when unused, or unfolded into the horizontal position for transport of a crew of up to six individual fire fighters and/or assorted equipment.

In a preferred embodiment, a main tank is equipped with an emergency dump and can be removed and replaced. In this embodiment, a top wall of the main tank can also be a fast-refill wall that has a series of louvers and control for nearly instantaneous refill. When gas fire extinguishing agents are used, appropriate gas tanks are used. If the main tank is removed, victims can be protectively transported within the space previously occupied by the main tank. Bomb disposal and removal of hazardous materials can also be accomplished with the invention. Other features optionally include a trailer hitch, optional electrification of the exterior panels, chain belt-drive, robotics arms and television operation. The vehicle optionally comprises the ability to provide a source of power for auxiliary equipment, such as, but not limited to, pneumatic, hydraulic, electrical, mechanical and other equipment. For example, drills and/or cutting tools, along with JAWS OF LIFE® (a registered trademark of Hurst Performance, Inc., Warminster, Pa.) type of devices comprising, for example, power operated pry bars, for extracting people from collapsed structures are within the scope of the present invention. In general, the vehicle is transportable by hovercraft and/or pontoon in addition to usual trailers for improved access to fires. In an alternative embodiment of the present invention, the vehicle is amphibious.

The present invention comprises a multipurpose emergency response vehicle ("vehicle") and/or mobile equipment platform comprising enhanced accessibility to remote areas, fast replenishment capabilities and maintenance, and increased ability to provide fire suppression materials and personnel. First, an overview of the basic components of the invention is described. One object of the invention is that it is constructed to minimize down-time, for example, through the use of fundamental physical, mechanical and/or electrical equipment. In a particular embodiment, the vehicle is operable without a computer control unit and/or sophisticated electronics. In such an embodiment, the vehicle is readily operated, maintained and repaired by fire fighting personnel. In this electrically unsophisticated embodiment, the vehicle is relatively immune to failure of an electronic circuit. Of course, a diesel engine that relies on glow plugs, as opposed to electrically operated spark plugs, optionally provides for an even more durable configuration. Consider also, for example, a steering mechanism that comprises a quite simple chain and sprocket, akin to bicycle/motorcycle components; if something should go wrong in the field, it can be fixed in the field with basic tools as opposed to specialized diagnostic equipment and computers.

The present invention is not a retrofit to an all-terrain-vehicle, motorcycle, JEEP® vehicle (registered trademark of Chrysler Corporation, Auburn Hills, Mich.), HUMVEE® truck (registered trademark of AM General Corporation, South Bend, Ind.), or pick-up truck, with fire fighting equipment adaptations. Of these vehicles, those that are small enough to be carried by a helicopter cannot carry enough load, and those that can carry enough load are too heavy and/or cumbersome to be carried by a helicopter. Unlike these other presently available vehicles, the present invention is a dedicated emergency response vehicle that does not utilize cabs and/or chassis manufactured by, for example, but not limited to, Ford, Chevrolet, or Mack corporations, as do most other fire fighting equipment. However, wherever possible, off-the-shelf parts are used to keep costs down and allow fast replacement.

The frame of the vehicle is preferably rigid and strong. Frame members are preferably made from standard available metal, for example, two inch×two inch×¼ inch thick steel tubing that is welded, and/or by two inch×six inch×¼ inch steel tubing. However, these dimensions can be altered depending on, for example, specific applications, etc. Heavy steel tubing provides strength and rigidity for pushing through obstacles as well as increased protection for the driver, occupants, and or equipment of the vehicle. Should the vehicle encounter a high impact or rollover, the occupants are protected. Furthermore, the drivers seat and safety belts are similar to those found in racing vehicles that provide for added safety and quick ingress and egress. In an alternative embodiment, the vehicle is operable without an occupant through, for example, a cable and/or remote communication means, such as, electromagnetic transmission. In such alternative embodiments, the vehicle comprises, for example, a control and/or retrieval mechanism should injury or harm threaten a driver, occupant or the vehicle itself. Such cable and/or remote communication and control means are well known in robotics and space vehicle arts and are within the scope of the present invention. Of course, the vehicle optionally comprises at least one cable attachment for transmission of material for life-support and/or fire-extinguishing and/or communication with an occupant, other individual, and/or the vehicle.

According to a preferred embodiment, within a basic vehicle platform, approximately 60 to 70 percent of all basic functions are served, and the remaining 30 to 40 percent of specific functions are served with optional equipment. The vehicle is highly adaptable to the given needs of a particular user, such as a local fire department, or a national forest fire fighting crew.

The outer "skin" of the vehicle optionally comprises a steel skin that is welded into place and/or a plate-type skin, for example an ⅛ inch aluminum plate, that is riveted to an internal frame. The advantage of the flat plate-type skin is that if one portion of the vehicle or the skin is damaged, only that plate needs to be replaced. This can be done quickly and economically. When used in riot crowd control situations, an electronic non-tampering skin can be installed on the vehicle to prevent people from touching the vehicle without sustaining a mild electrical shock. In such instances, gas tanks comprising tear gas and/or other crowd dispersal gasses are fitted. Furthermore, the pump and nozzle can be used to spray water or other chemicals onto the riotous crowd when necessary.

In a preferred embodiment, the vehicle comprises a gas engine, such as, but not limited to, a Volkswagen corporation 1800 cc air-cooled gasoline engine. Alternatively a diesel engine can be used, such as, but not limited to, a Motorenfabrik HATZ GmbH & Co. KG four cylinder air-cooled diesel engine. Of course, liquid cooled engines are also within the scope of the present invention as are electrical motors. In a preferred embodiment, a shielded electrical motor is used, optionally comprising isolation of electrical sparking discharge, for example, but not limited to, a motor shrouded by in an inert gas. In instances where sparks from an electrical motor are not detrimental to operation, then further precautions are not needed. In addition, an alternative embodiment comprises a hydraulic drive driven by an electric motor and/or fuel combustion engine. Such hydraulic or hydrostatic drive units for transmitting power to traction devices, such as wheels, are known in the art of, for example, golf course maintenance equipment (for example, for raking steeply walled sand traps) and military equipment. Hydrostatic travel or drive transmissions, such as, but not limited to those manufactured by Haaglunds corporation and/or Brueninghaus Hydromatik GmbH, are within the scope of the present invention. In a preferred embodiment, at least one transmission is used, comprising, for example, a Volkswagen corporation transaxle or Haaglunds hydrostatic drive. In a preferred embodiment, the vehicle comprises a slidable engine cradle that preferably comprises 1½ inch square steel tubing. In a preferred embodiment, the vehicle comprises at least one hydraulic clutch.

Preferably the main axles are 3¼ inch solid steel with tapered bearings, such as, but not limited to, TIMKEN® (registered trademark of the Timken Company, Canton Ohio) tapered bearings. In a preferred embodiment, a vehicle nose wheel assembly comprises a swivel fork. According to a preferred embodiment, a steering assembly comprises a chain and sprocket mechanism and/or a hydraulic mechanism. In embodiments comprising a hydraulic steering mechanism, the mechanism is powered by the power source, whether it be electrical and/or fuel combustion. For embodiments comprising an electrical system, voltage comprises any appropriate voltage or voltages, for example, but not limited to, 5, 6,12 and/or 24 volts. In general, fuel combustion engines that rely on electrical spark plugs operate on 6, 12, and/or 24 volt systems.

In a preferred embodiment, the present invention comprises at least one hydraulically driven approximately 30-gallon per minute, approximately 200 pounds per square inch pump, such as, but not limited to, pumps made by the Hypro corporation (e.g., fluid handling pumps, namely, piston pumps, roller pumps, diaphragm pumps, centrifugal pumps, flexible impeller pumps, and/or gear pumps). In a preferred embodiment, the pump and nozzle of the vehicle are capable of shooting a stream of foam approximately 25 meters, therefore, the vehicle need only get within approximately 10 meters of the object to be sprayed to adequately cover the object. In a preferred embodiment, a main overhead tank comprises a capacity of preferably approximately 2250 liters and preferably comprising polypropylene. In a preferred embodiment, the present invention comprises at least one and preferably at least two modular auxiliary tanks preferably comprising individual capacities of approximately 75 liters, preferably for holding 150 liters of fire-extinguishing agents/material, or agents that assist in fire-extinguishing, such as, but not limited to, surfactants. Alternatively any or all of the tanks can carry other fire-suppressing materials, such as, but not limited to, gels.

In a preferred embodiment, an eductor mixes water, preferably from the main overhead tank, and surfactant, preferably from an auxiliary tank, in approximately a 14:1 ratio to produce fire-suppressing foam. Mixing 2250 liters of water with 150 liters of surfactant produces approximately 34,000 liters of foam. This amount is sufficient to cover a 50 meter by 60 meter area, 5 cm deep. In a preferred embodiment, the nozzle and eductor comprise, for example, those sold by Elkhart Brass, a fire fighting and fire protection equipment supplier. According to a preferred embodiment of the present invention, nozzle and foam equipment comprises, but is not limited to, automatic nozzles, constant gallonage nozzles, and select gallonage nozzles and inline and by-pass foam eductors and foam aeration tubes. There are occasions in fire suppression when greater expansion rates of foam solution are needed; such as when polar solvent fuels are involved; when using protein or fluoroprotein foam; or when securing a spill. For these special situations a foam aeration tube can be quickly and easily attached to a combination fog nozzles in order to acheive a higher expansion rate of a foam solution, for example, up to approximately 15:1 in some cases.

When an exterior water source is available, such as from a swimming pool, lake, fire hydrant, or from another fire fighting vehicle, then a main overhead water tank is optionally filled with surfactant and the vehicle can put out approximately 500,000 liters of foam. Of course, other agents may be suitable in such situations. In addition, if a source of compressed gas is available, the vehicle of the present invention optionally comprises a hook-up to this source for propulsion of gas, foam, powder, and/or other fire extinguishing material.

According to a preferred embodiment, the vehicle comprises a compact stature, for example, approximately 4.5 meters in length, 1.5 meters in width, and 2 meters in height. Given the particular dimensions and components just described, such a vehicle weighs approximately 1,300 kilograms when empty and approximately 3,600 kilograms when fully loaded. In a preferred embodiment, such a vehicle attains a speed of approximately 30 kilometers per hour when completely loaded, and provides a great deal of torque, pushing and pulling power. Such engines as described earlier, available with ratings of approximately 54 horsepower, are optionally capable of achieving this performance.

According to a preferred embodiment, the vehicle will meet, set and/or exceed all ASTM and ISO national and international standards.

Referring to the drawings, FIG. 1a shows a front perspective view of the preferred embodiment of the present invention for an emergency response vehicle 10 having a wedge-shaped nose 14 for maneuvering through brush, trees, automobiles, or any obstacle in the path of the vehicle 10. The wheel base is triangular. Attachment points 12 are provided for cargo-type parachutes to permit the vehicle to be airdropped, or alternatively to be airlifted. At least one step 16 is provided for the driver of the vehicle 10. A steering mechanism and a nose suspension 100 provides for 360-degree rotation of a front wheel 20 that is described further below. All tires mounted on wheels 20, 22, and 24 are preferably "runflat" and are particularly durable, and can run even though the air has been released from them. The wheels 20, 22, and 24 and associated tires can be those made, for example, by Hutchinson for military applications. While one front wheel 20 is shown in FIG. 1, a dual-wheel assembly is alternatively used to provide added stability and improved ability to move across rough terrain.

Figure 1B:
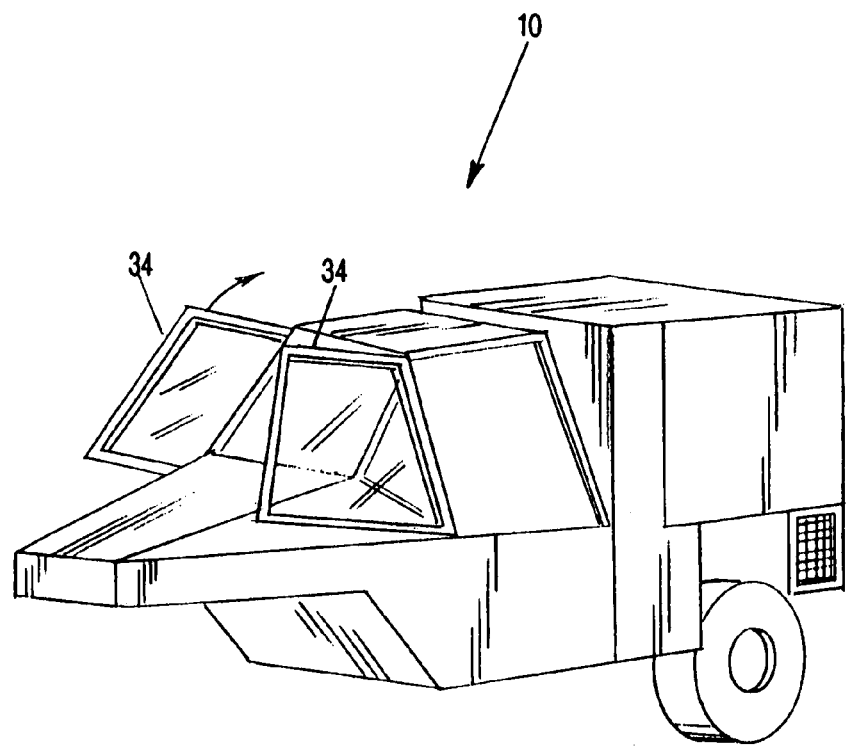
FIG. 1b is a perspective view of a preferred embodiment of the present invention.
Figure 1C:
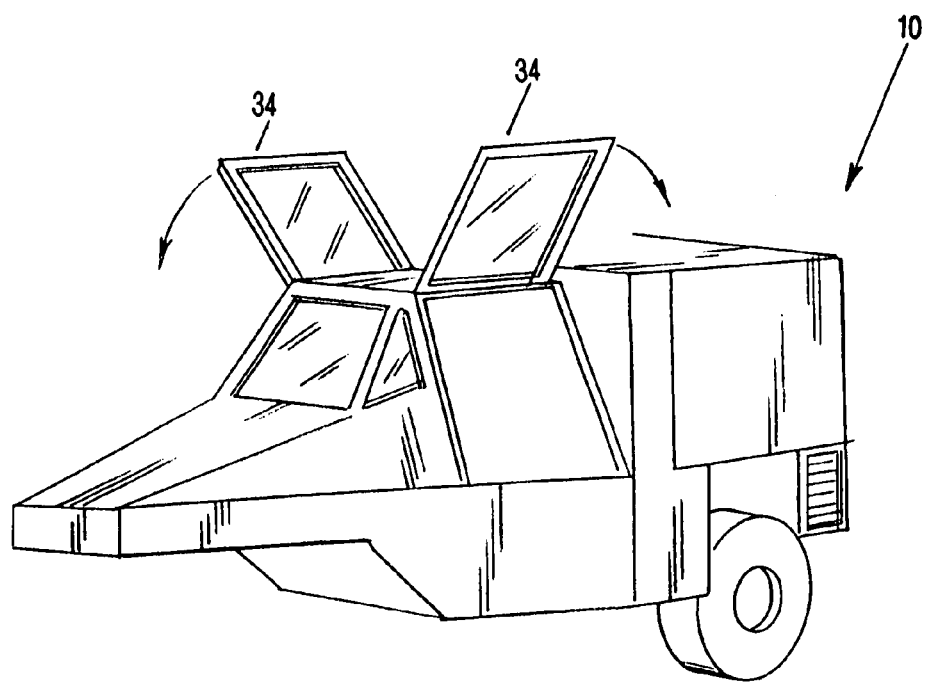
FIG. 1c is a perspective view of a preferred embodiment of the present invention.

A primary nozzle location 26 is positioned on the nose 14 for distribution of water or fire suppression material. A tapered windshield frame 28 provides for a front windshield 30 and side windows 32, described in further detail below also optionally acts as a roll-bar for protection of occupants. At least one driver access door 34 permits easy access to the cab of the vehicle 10. The cab can accommodate either one or two persons, but preferably just one. Referring to FIG. 1b and FIG. 1c, the at least one door 34 optionally comprises hinges to facilitate opening outward and upward, or outward and forward, or alternatively the at least one door opens to the left or right. Hydraulic cooling is provided within the cooler area designated 40.

Modular auxiliary tanks are located within the area referred to as 38 and are typically used for storing surfactant.

The rear portion of the vehicle 10 comprises the main overhead tank within the tank area designated 36. A steering mechanism 200, is described further below, is housed underneath a steering mechanism access door 42. It can be seen from FIG. 1a that the nose 14, a sloped front undercarriage 44, and the windshield frame 28 together taper out and away from obstacles that the vehicle 10 may encounter in its path, thereby allowing the vehicle 10 to easily push through obstacles and force them aside. The heavy steel construction of the vehicle 10 makes it particularly easy to move obstacles. The undercarriage 44 is preferably painted light gray in color to enable operators to spot fluid leaks or stress cracks instantly. Oxygen and/or air tanks are located within the air tank area generally shown at 60, and provide oxygen and/or air to the cab of the vehicle 10 and/or to the main tank compartment within 36 for the driver and/or passengers.

Figure 2:
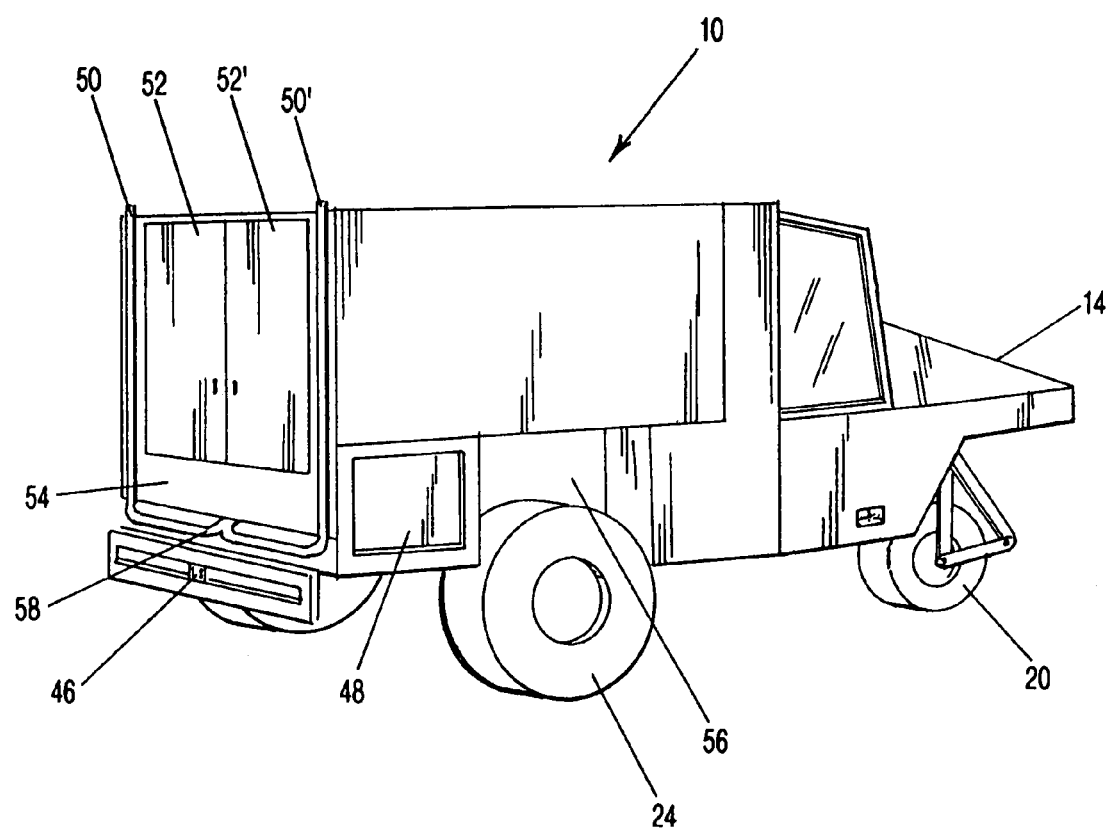

Referring to FIG. 2, a rear perspective view of the apparatus of FIG. 1a is shown. The engine is substantially located within the engine space shown at 54. The engine space designated 54 is accessible and the engine is optionally slid out from the engine compartment upon its sliding cradle for fast maintenance and/or replacement. Engine exhaust travels from an exhaust system junction 58 and out through dual exhaust pipes at 50 and 50'. An hydraulic fluid reservoir is located within the reservoir area shown at 48.

At least one inspection and maintenance port 56 is provided on each side of the vehicle for access to, for example, quick disconnects, engine/transmission compartments, for maintenance, engine/transmission removal, etc. Hinged doors 52 and 52' swing open to provide access to the main overhead tank as will be described further below. A trailer hitch receiver 46 is provided to allow the vehicle 10 to pull additional loads. For example, a standard trailer hitch can accomplish this task. For example, a firehose trailer can be hooked up to a trailer hitch in trailer hitch receiver 46 such that the vehicle 10 can lay out whatever amount of hose is needed behind it to reach the emergency site. This enables the vehicle 10 to be connected to an external water and/or other fire suppression material source when necessary. As mentioned earlier, the undercarriage and/or frame of the vehicle preferably comprises a color that easily shows spots of operational fluids, for example, light grey. Additionally, heat reflective surfaces and/or surface colors are preferred, such technology is known to those of ordinary skill in the art of space vehicles.

FIGS. 3 and 4 provide a top view and side view respectively of a frame 70 of the vehicle 10. Attachment points 12 are shown in various locations on the frame 70 for airlifting or airdropping the vehicle 10 from and to an emergency site. For example, the vehicle 10 can be carried by a helicopter and/or dropped by cargo-type parachutes to a site. The nose 14, and the two modular auxiliary tank compartments 38 and 38' are shown in FIG. 3. The tip 76 of the nose 14 shows a plurality of bracings to both support the nose wheel structure and provide additional strength in the nose 14 when ramming into obstacles in the path of the vehicle 10, such as when wedging through doorways, between walls, between cars, etc. This is different from the energy-absorbing devices used on automobiles that are intended to collapse rather than remain rigid upon impact. The nose 14 is intended to be rigid and to remain rigid upon impact. The slope of nose 14 also provides the driver with a high degree of visibility. The cab of the vehicle 10 rests upon the area shown generally at 72. A sliding engine cradle rests upon the supports shown in the area designated as 74.

Given that the vehicle 10 comprises the ability to maneuver through a variety of terrain and through a variety of obstacles, two types of steering are optionally provided. The first is a 360 degree nose wheel discussed above that minimizes the possibility of the vehicle from becoming trapped by an inability to turn the wheels, and the second is the ability to steer the vehicle by using brakes that are on alternate sides of the vehicle. The vehicle has two brake pedals, one for the left brakes and one for the right brakes so that the driver can lock up, as an example, the right brakes, leaving the left side free to drive the vehicle forward, thereby pivoting the vehicle in a right-hand direction.

Figure 5:
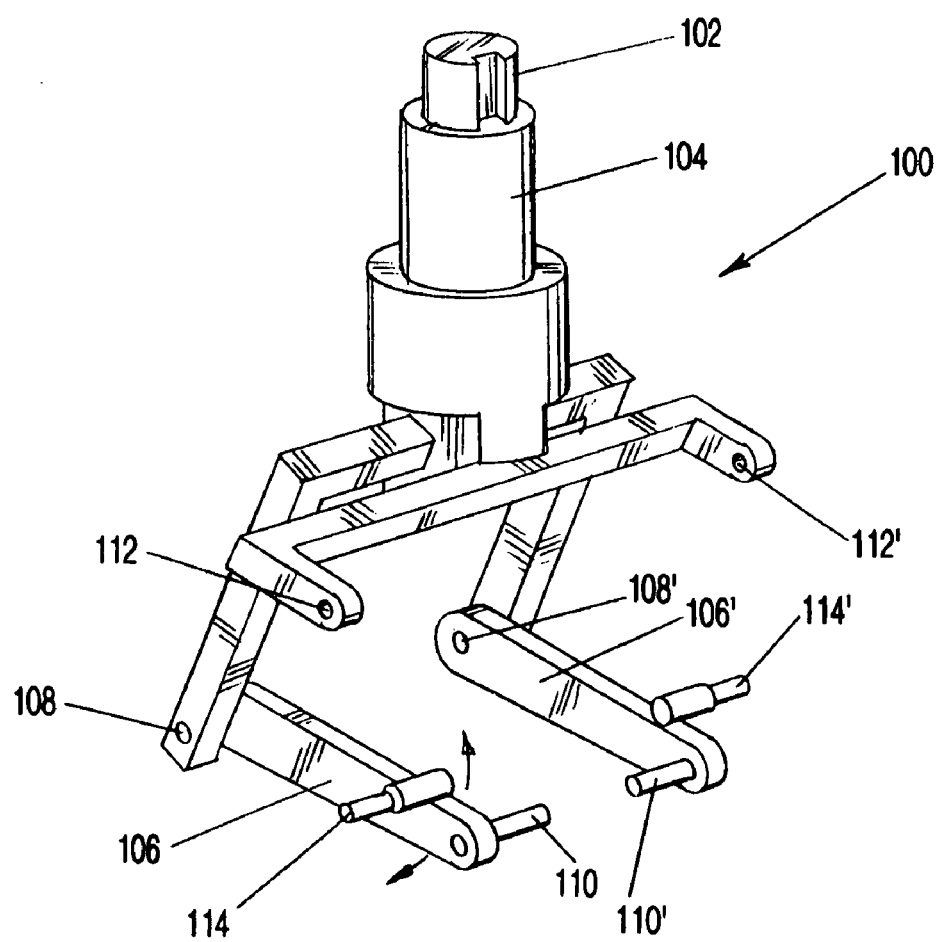
FIG. 5 is a first embodiment of the steering and shock mechanism for the front wheel of the present invention.

FIG. 5 shows a first, shock absorber, embodiment for a steering mechanism and a suspension 100 of the present invention to control the front nose wheel 20 seen in FIGS. 1 and 2. A keyed and threaded lock 102 is connected to a main spindle 104, which in turn supports rocker arms 106 and 106'. The main axle is shown at 110 and 110' for the front nose wheel 20. Pivot points at 108 and 108' allow the rocker arms 106 and 106' to pivot. Shock absorber mounting points are shown at 112, 112',114, and 114'for mounting, for example a coil over shock type shock absorbers.

Figure 6:
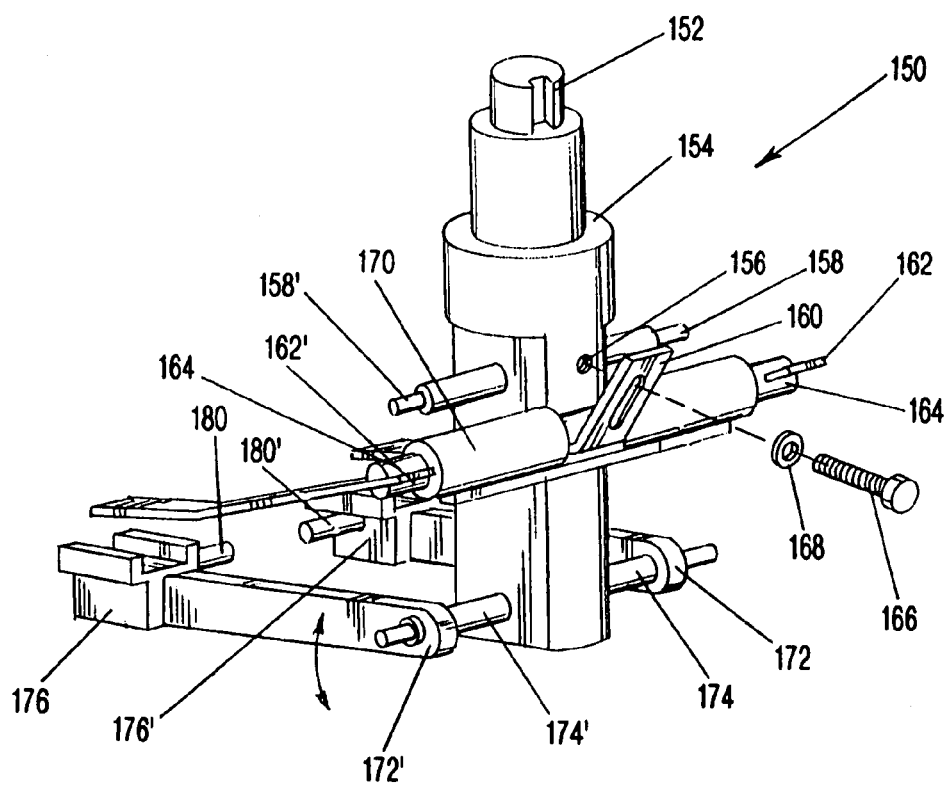
FIG. 6 is a second embodiment of the steering and shock mechanism for the front wheel of the present invention.

FIG. 6 shows a second, leaf spring, embodiment for a steering mechanism and a suspension 150 of the present invention to control the front nose wheel 20 seen in FIGS. 1 and 2. As in FIG. 5, the keyed and threaded lock 152 is connected to the main spindle 154. A leaf spring retaining rod is shown at 164. A retaining rod housing 170 houses a leaf spring retaining rod 164. Leaf springs are shown at 162 and 162'. A tension bolt 166 and a nut 168 fit through a tension plate 160 and enter a threaded hole 156. Upper shock-absorber mounting pins are shown at 158 and 158'. Rocker arms 172 and 172' are connected to a leaf spring saddle made up of 176 and 176'. The rocker arm shafts are shown at 174 and 174'. Main axles are shown at 180 and 180' with lower shock-absorber mounts.

Figure 7:
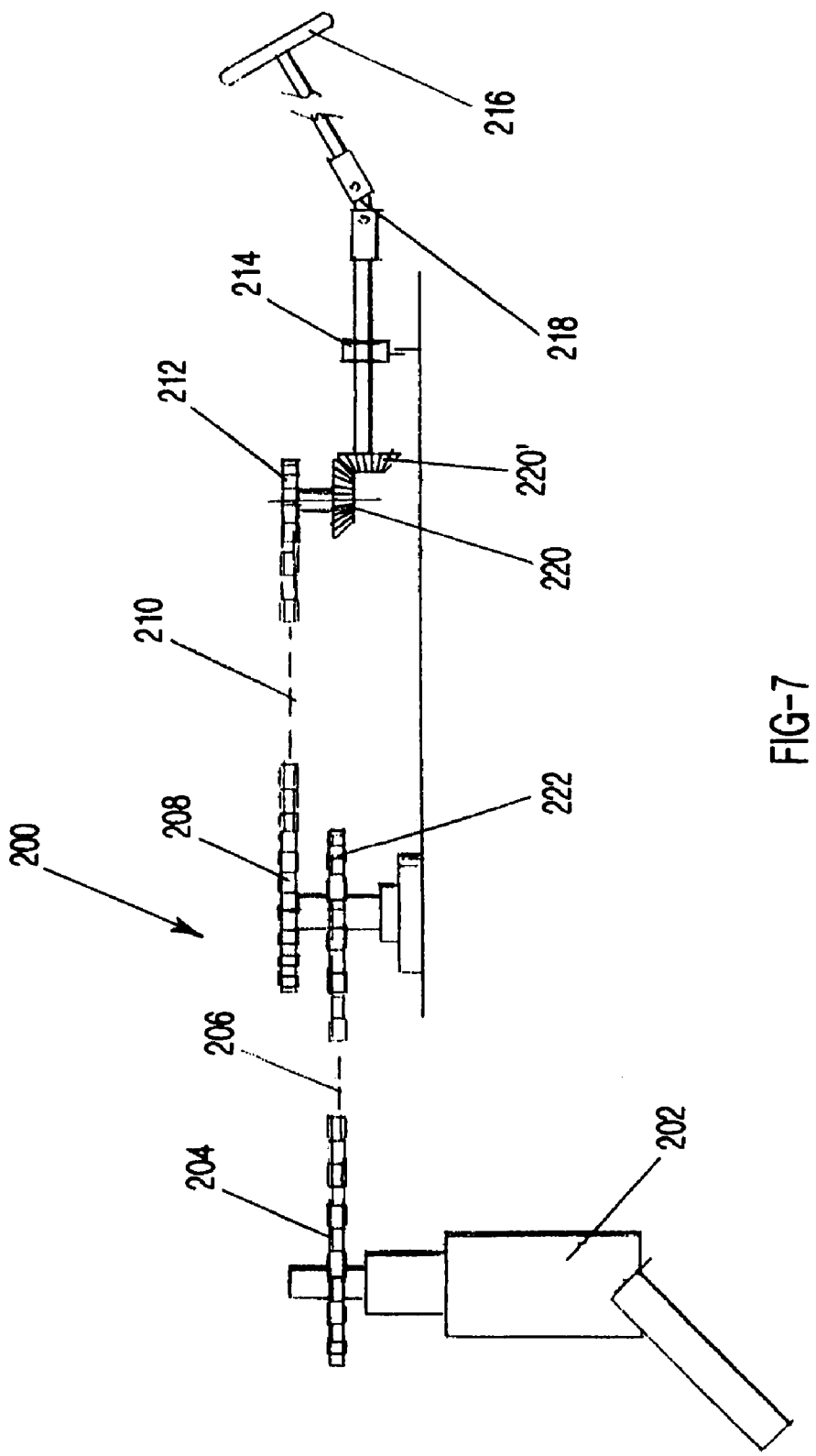
FIG. 7 is a side view showing the chain and sprocket steering mechanism of the present invention.
Figure 8:
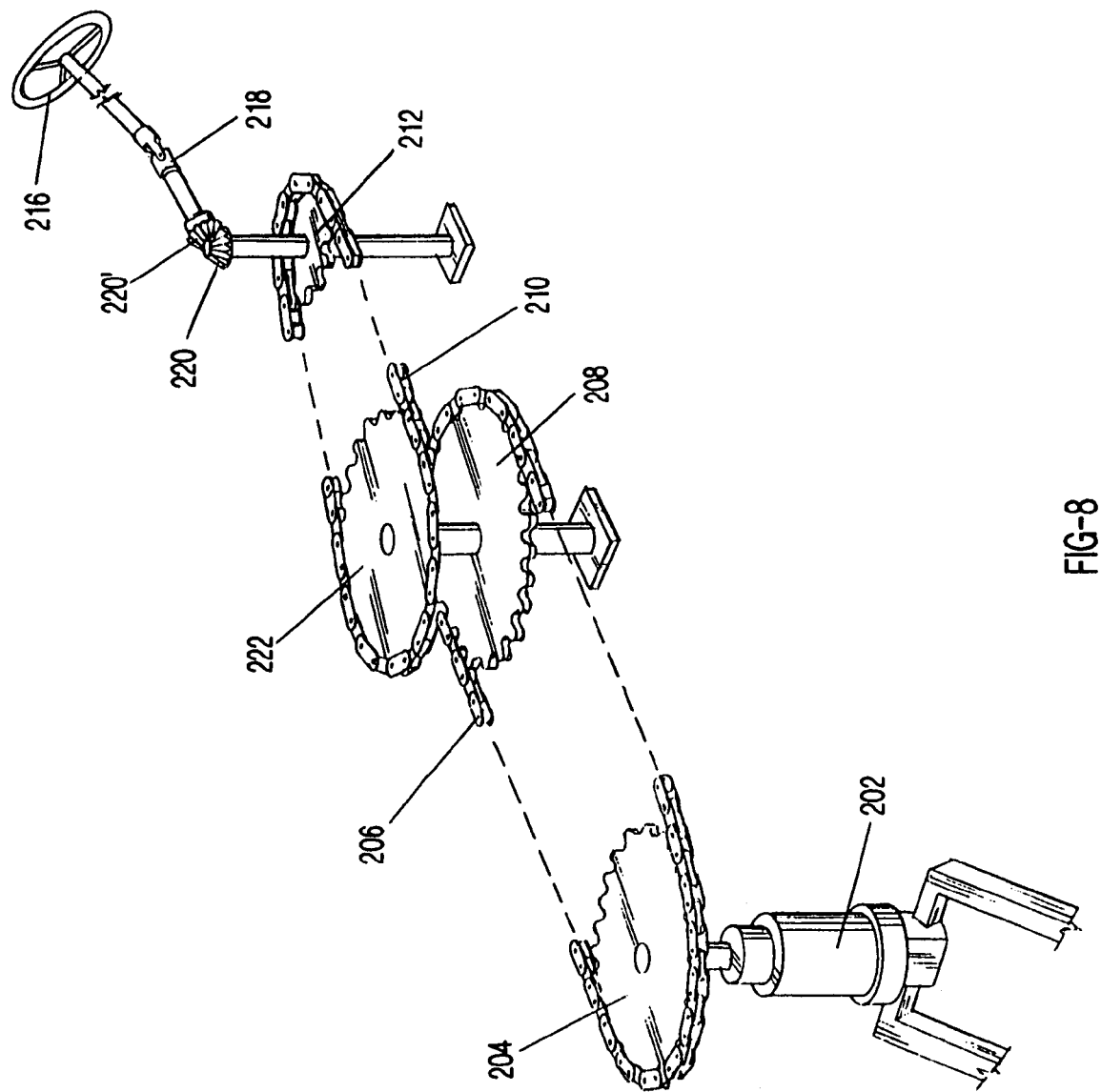
FIG. 8 is a top perspective view of FIG. 7.

FIG. 7 is a side view and FIG. 8 is a top perspective view of the chain and sprocket steering mechanism 200 of the present invention. In this embodiment, a pivot assembly 202 optionally comprises either the main spindle 104 or 154 discussed above with respect to FIGS. 5 and 6. Sprockets 204, 208, and 222 optionally comprise, for example, 40-tooth sprockets, and sprocket 212 optionally comprises, for example, a 10-tooth sprocket, thereby giving the driver a four to one mechanical advantage when steering. A steering wheel 216 is provided in the cab of the vehicle 10 and is connected via a universal joint 218 to a heim joint 214 and miter gears 220 and 220'. While FIG. 7 shows chains 206 and 210 in opposite positions as shown in FIG. 8 the principle of operation is the same. At least one chain 206 turns due to the rotation of the sprockets 204 and 208, while at least one chain 210 turns due to the rotation of the sprockets 222 and 212, seen best in FIG. 8. The end result is that the steering wheel 216 turns the pivot assembly 202 in the same direction as the steering wheel 216 is turned.

Figure 9:
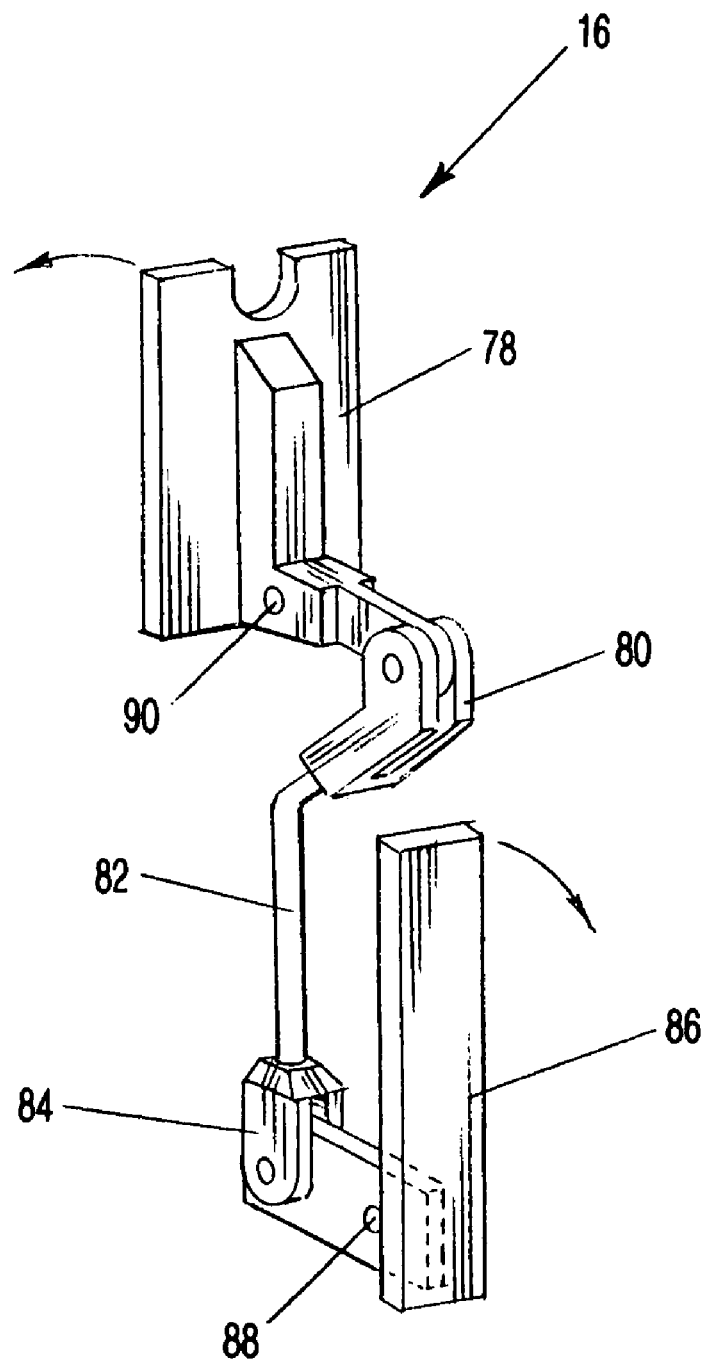
FIG. 9 shows a retractable step of the present invention.

FIG. 9 provides details of an optionally retractable step 16 as shown in FIG. 1a. To operate the step 16, a handle 78 is pulled down to allow the operator to swing a step 86 down into a usable position. The step 86 is connected via a pivot point 88 to a clevis fork and pin 84 which is in turn connected to a connecting rod 82 to a second clevis fork and pin 80 to a second pivot point 90 to the handle 78. The second pivot point 90 is mounted via a thru-bolt to a bracket mounted in the cockpit.

Figure 10:
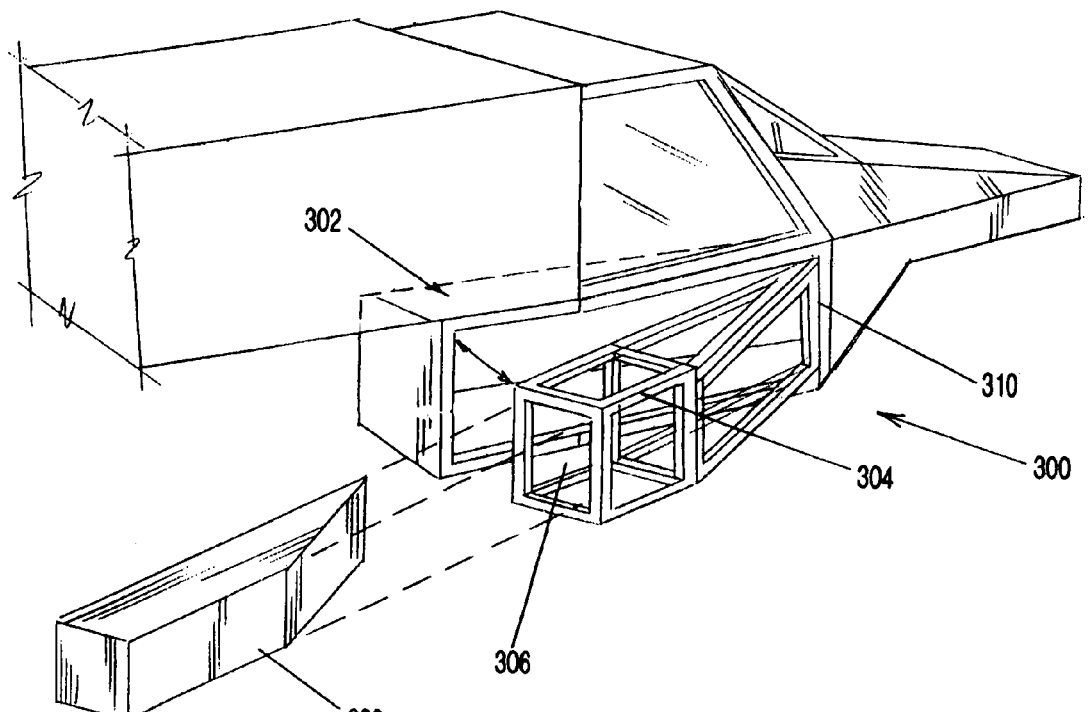
FIG. 10 is a side perspective view of the present invention showing one of the modular auxiliary tanks and the manner in which it is replaced.

Referring to FIG. 10, a side modular auxiliary tank 300 is shown. In a preferred embodiment, the vehicle comprises two tanks, one on each side, and each are preferably approximately 75 liter tanks. According to such an embodiment, both tanks operate in the same manner. An auxiliary tank frame 304 is hinged onto the vehicle via a hinge at 310. The modular tank 308 is inserted into the tank frame 304 via an insertion end 306. Then the tank frame 304 is swung into the vehicle auxiliary tank frame compartment 302. Preferably each of these tanks contain a material, such as, but not limited to, surfactant that can then be mixed with water from the main overhead tank to form a fire suppressing foam. In a preferred embodiment of the present invention, connections to a foam generating mechanism, as discussed above, comprise quick attachment and detachment connectors.

Figure 11:
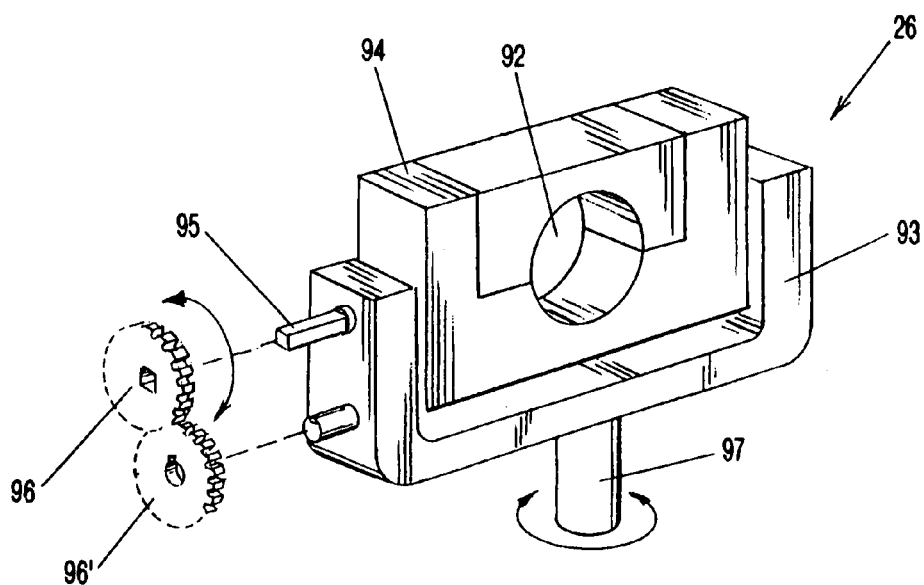
FIG. 11 shows a manual nozzle pivot of the present invention for distributing fire suppression materials.

FIG. 11 shows a manual (or alternatively hydraulic) nozzle pivot 26 of the present invention, seen in FIG. 1a near the tip of the nose 14 of the vehicle 10. Alternatively, an electronic nozzle pivot can be accommodated. A nozzle clamp assembly 94 has a nozzle opening 92 for clamping a manufactured nozzle to the pivot assembly. Clamp bracket 93 holds assembly 94. Chain sprockets 96 and 96' turn a pivot shaft 95. Alternatively, either or both of chain sprockets 96 and 96' optionally comprise spur gears. A rotation shaft 97 optionally comprises the ability to be manually and/or hydraulically rotated independent of pivot shaft 95.

Figure 12:
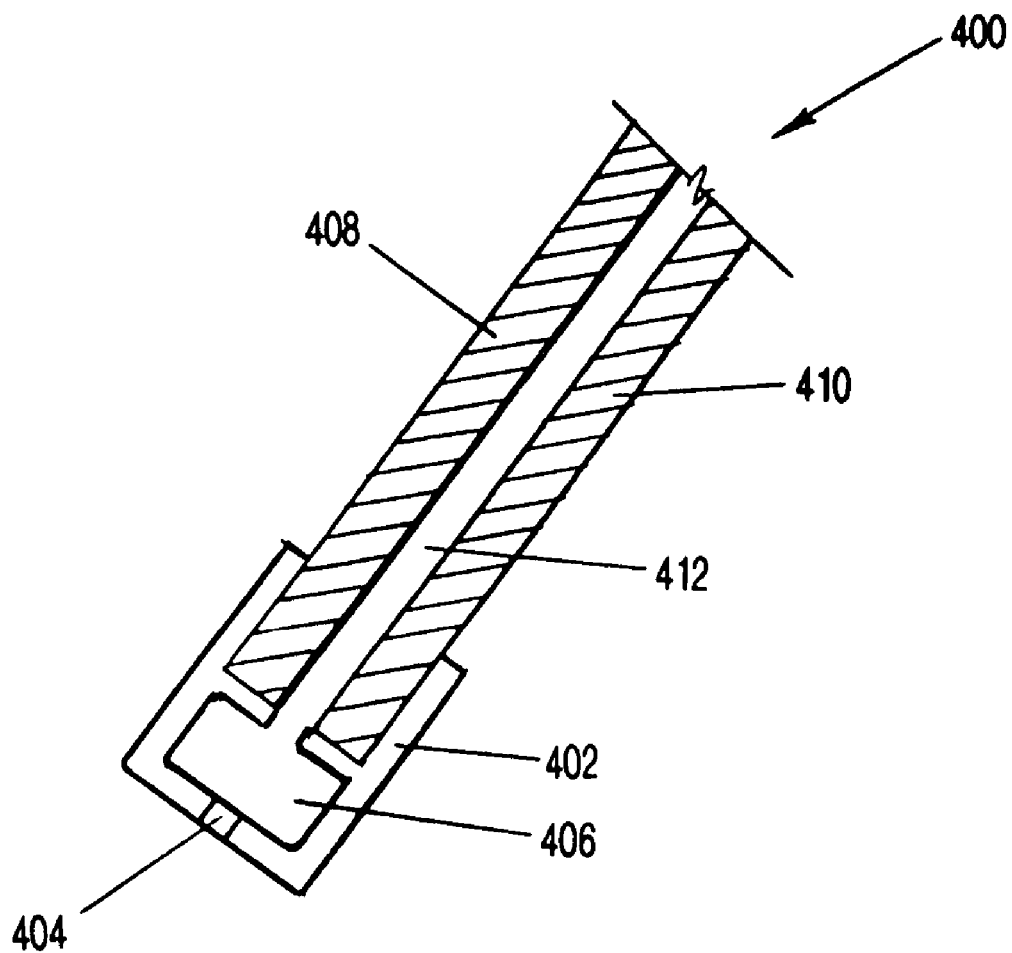
FIG. 12 is a cross-sectional view of the fire glass and interior plastic windshield of the present invention.

FIG. 12 shows a cross-section of a portion of the fire resistant, impact-resistant, and cooled glass 400 used in the windshield 30, side windows 32, and doors 34 as seen in FIG. 1a. A metal frame 402 supports and contains at least one inlet 404 for the entrance of cooling air, that optionally comprises cooling air supplied from an optional air-conditioning unit in the vehicle. The cooling air is fed through cooling air passage positioned at 406 and 412 between the exterior glass 408 and an interior glass comprising glass and/or preferably plastic 410. This passage can be approximately 3/8 to 1/2 inch wide. Preferably, the exterior glass 408 comprise a thickness of approximately 1/4 inch heat resistant glass, such as FIREGLASS® (trademark of Technical Glass Products, Kirkland, Wash.) and preferably interior glass 410 is comprised of approximately 1 inch thick LEXAN® (a registered trademark of General Electric Corporation, Schenectady, Mass.) impact resistant polycarbonate. The LEXAN® glass comprises bulletproof qualities. In the event that a tree or something else explodes, the debris or shrapnel is deflected away from the driver. The glass assembly of the aforementioned preferred embodiment, allows for operation of the vehicle in close proximity to high heat areas that cannot normally be tolerated by conventional vehicles. According to the description herein, the term glass refers generally to a see through material comprising glass and/or other materials. In alternative embodiments, it may be necessary to minimize occupant exposure to radiation (electromagnetic, including heat, and/or particle radiation). In such embodiments, glass comprises radiation reflective and/or impermeable glass and/or glass area is minimized.

Figure 13A:
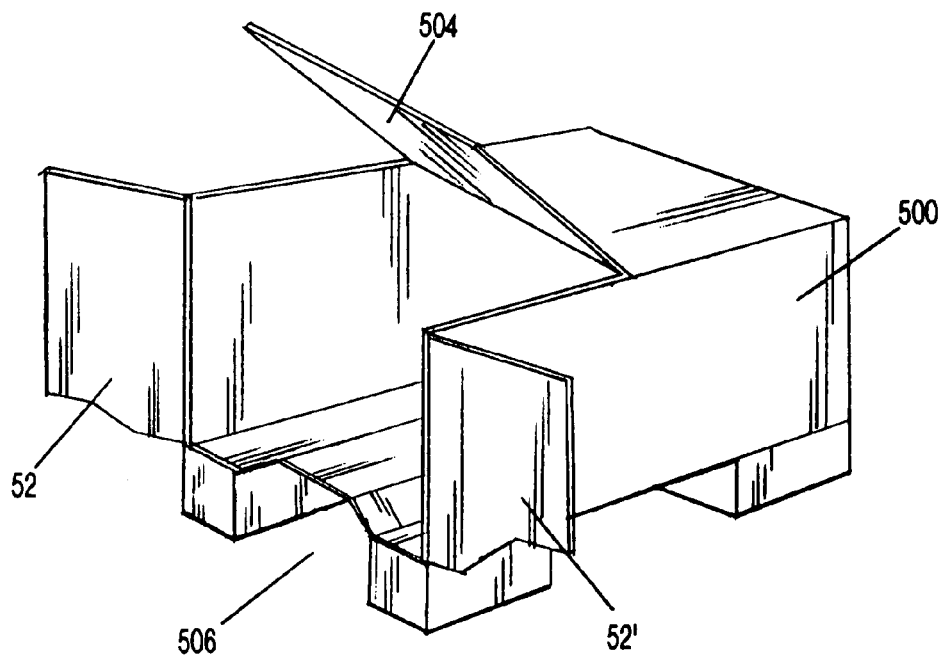
FIGS. 13a–c show the hinged access lid to the main tank compartment and the hinged rear doors of the present invention.
Figure 13B:
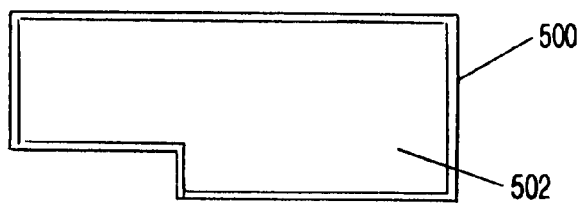
Figure 13C:
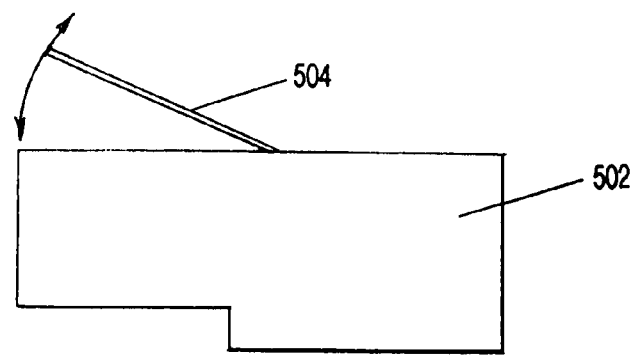

FIGS. 13a–c show a perspective view of a steel main overhead tank compartment 500, the main overhead tank within a compartment 502, and a hinged access lid 504 to the main tank respectively. According to several embodiments, this particular assembly is absent from the vehicle when the assembly shown in FIGS. 18–22 is used. When rear doors 52 and 52' are opened and access lid 504 is opened, main tank 502 is easily accessed for fast removal when empty or to refill. An emergency (for example, approximately 8 inch) butterfly valve is provided with the main tank 502 for emergency dumping of its contents. This is particularly useful when there are victims, fire fighters, or other animals, or objects, needing rapid transport away from the site. Once the main tank 502 is removed from its compartment within 500, individuals can ride within the protective confines of the compartment 500. Furthermore, the air and/or oxygen supply to the cab can additionally be routed into compartment 500 to sustain these individuals. Of course, individual tanks of air and/or oxygen are optionally provided in the vehicle to sustain individuals in need.

Figure 14:
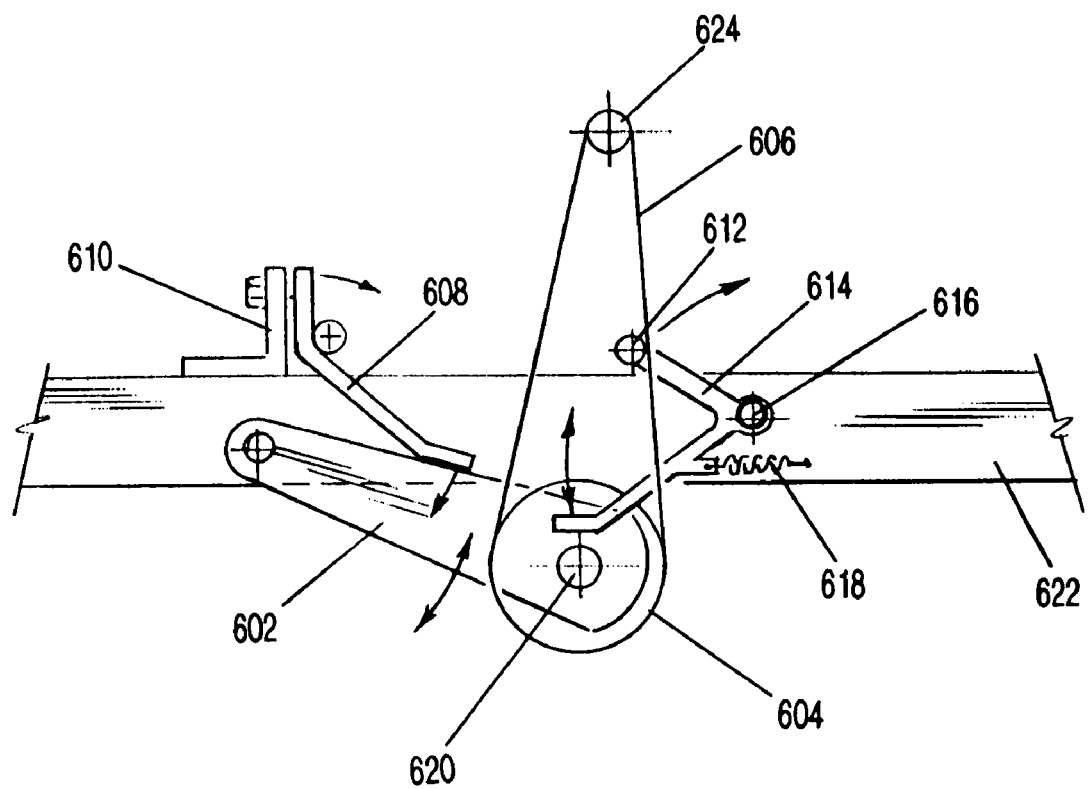
FIG. 14 shows a main axle suspension of the present invention.

FIG. 14 shows a main axle suspension 600 of the present invention. A rocker arm 602 connects to a main axle 620 via a bearing assembly 604. A chain 606 runs between the sprocket 604 and a transaxle 624. A leaf spring 608 is provided tension by a leaf spring tension bolt 610. A roller 612, a bell crank 614, operate through a bell crank pivot 616 and a spring 618 to the main axle. The main frame is shown at 622.

Figure 15A:
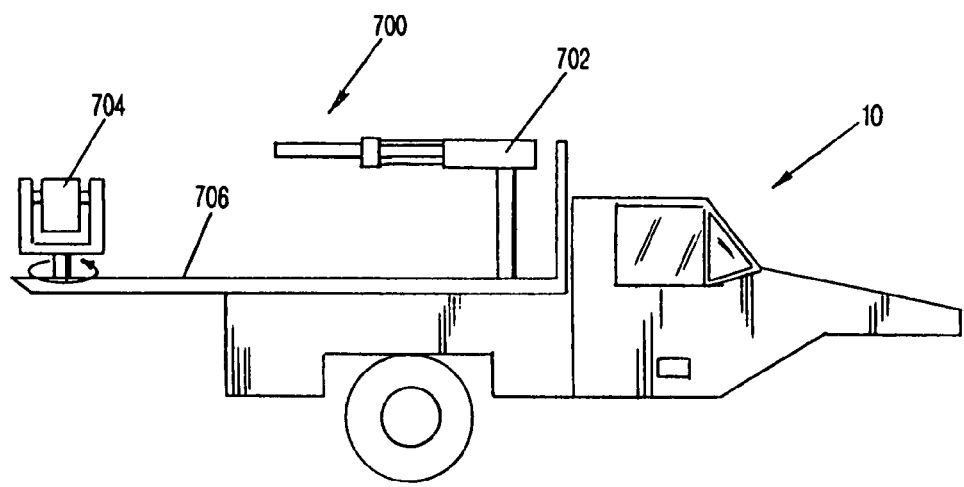
FIGS. 15a–b show the tilt-bed and robotic arm embodiment of the present invention.
Figure 15B:
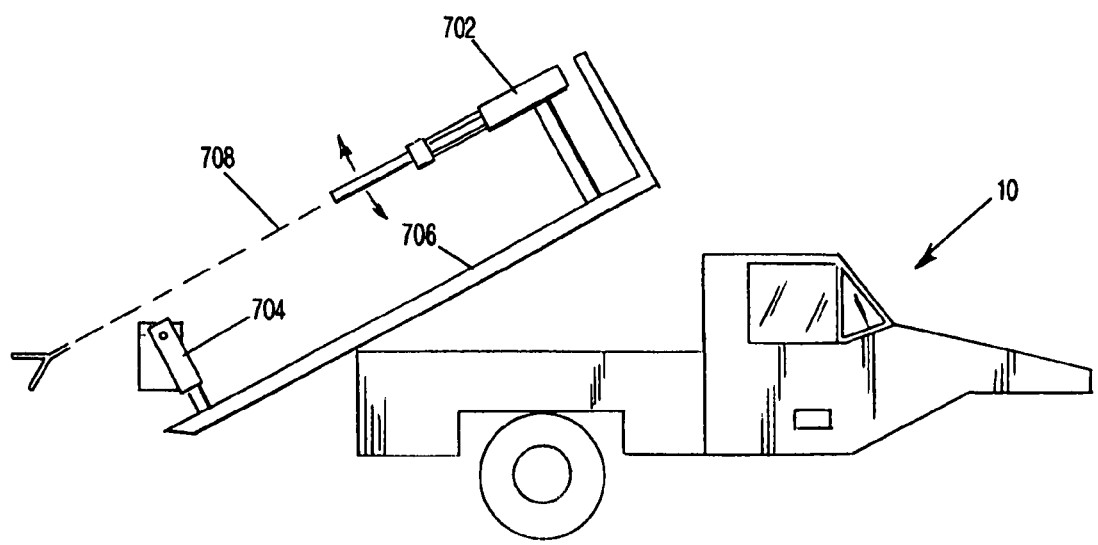

Turning now to FIGS. 15a and 15b, an alternative embodiment for the vehicle 10 is shown wherein an assembly 700 comprising a tilt-bed 706 and a robotic arm 702 is useful for, for example, bomb disposal. According to this particular embodiment, the tilt-bed 706 is hydraulically operated to place a gimble and/or a basket 704 in close proximity to a bomb or explosive device. In such an embodiment, the tilt-bed 706 is installed in place of a water tank, for example, the main water tank. Once the tilt-bed 706 is elevated, the robotic arm 702 is extendable and useable for placing the bomb or explosive device into a gimbal and/or a basket 704. An extension 708 of the robotic arm 702 is used for finer control of the robotic arm 702. Once the tilt-bed 706 is lowered into the horizontal position, the explosive device is transportable to another site by the vehicle 10, and then dumped by raising the tilt-bed 706 again. The tilted bed 706, when in the raised position, optionally serves as blast protection for the vehicle 10 during this type of operation.

Figure 16:
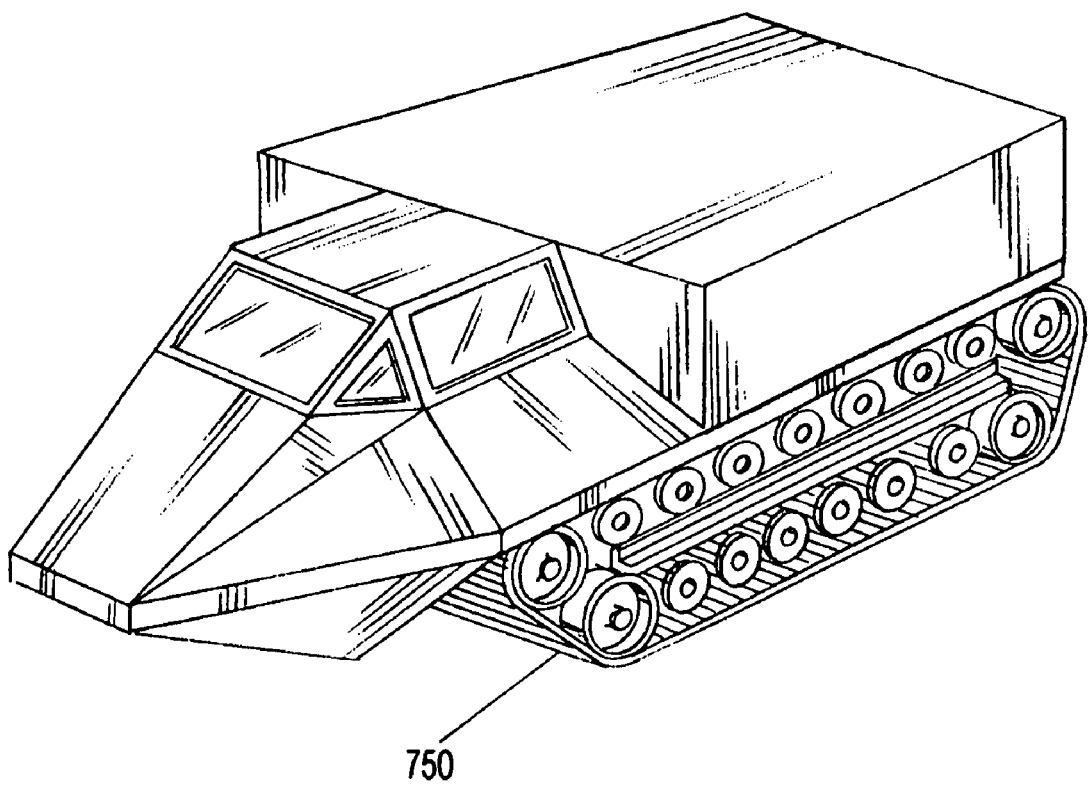
FIG. 16 shows an alternative crawler embodiment of the present invention having tracks for mobility.
Figure 17:
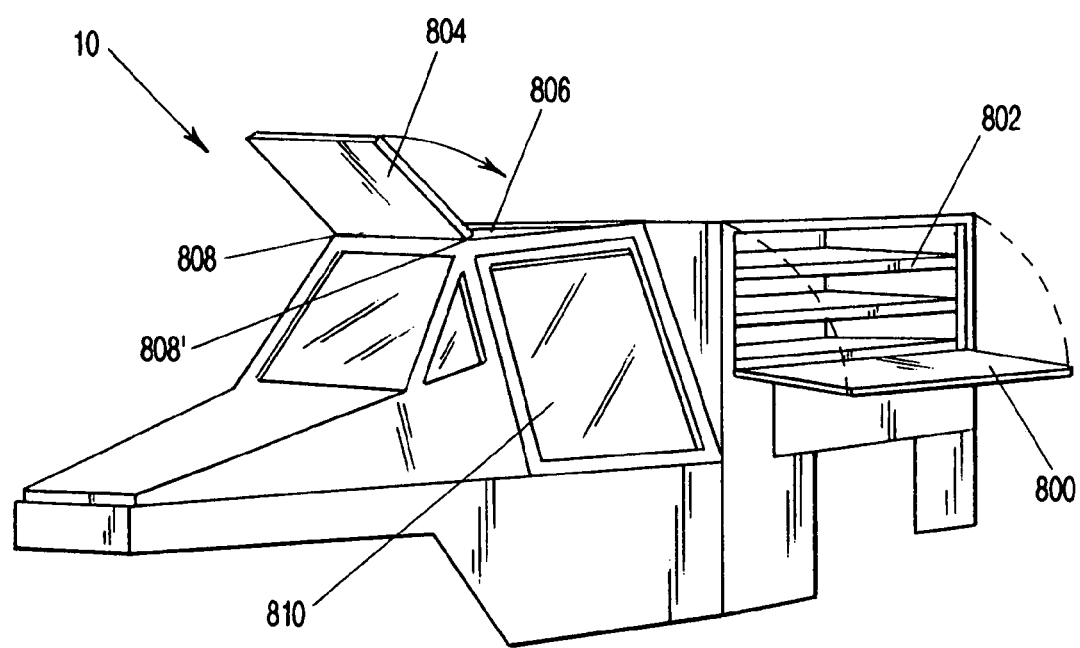
FIG. 17 shows the retractable lifter/crew racks and an optional driver entry hatch of the present invention.

FIG. 16 shows an alternative traction means comprising a crawler mechanism wherein tracks 750 either replace or are added in addition to the wheels for additional mobility. FIG. 17 shows optional litter or crew racks 800 that can be affixed to either or both sides of the vehicle 10. The litter or crew rack 800 is stored in an upright vertical position against a side wall of the vehicle 10 at 802. It is optionally hingedly connected to the side wall. When swung outward into the open horizontal position, a single litter or crew rack 800 can hold up to approximately three firefighters or a variety of equipment. When the litter or crew rack 800 is in the open horizontal position, it can also be used to haul injured people on stretchers or litters. Additionally, crew equipment can be loaded on top of the vehicle 10 for transport to the site. An optional driver entry hatch 804 is located on the ceiling of the cab 810 for an alternate entry into the vehicle 10. The hatch 804 is optionally hingedly connected to the ceiling of the cab 810 at 806. The entry hatch 804 swings down to the closed position and latches securely. In the event that branches or other debris might jam the hatch, explosive bolts located at 808 and 808' enable removal of the hatch to let the driver depart safely.

Figure 18:
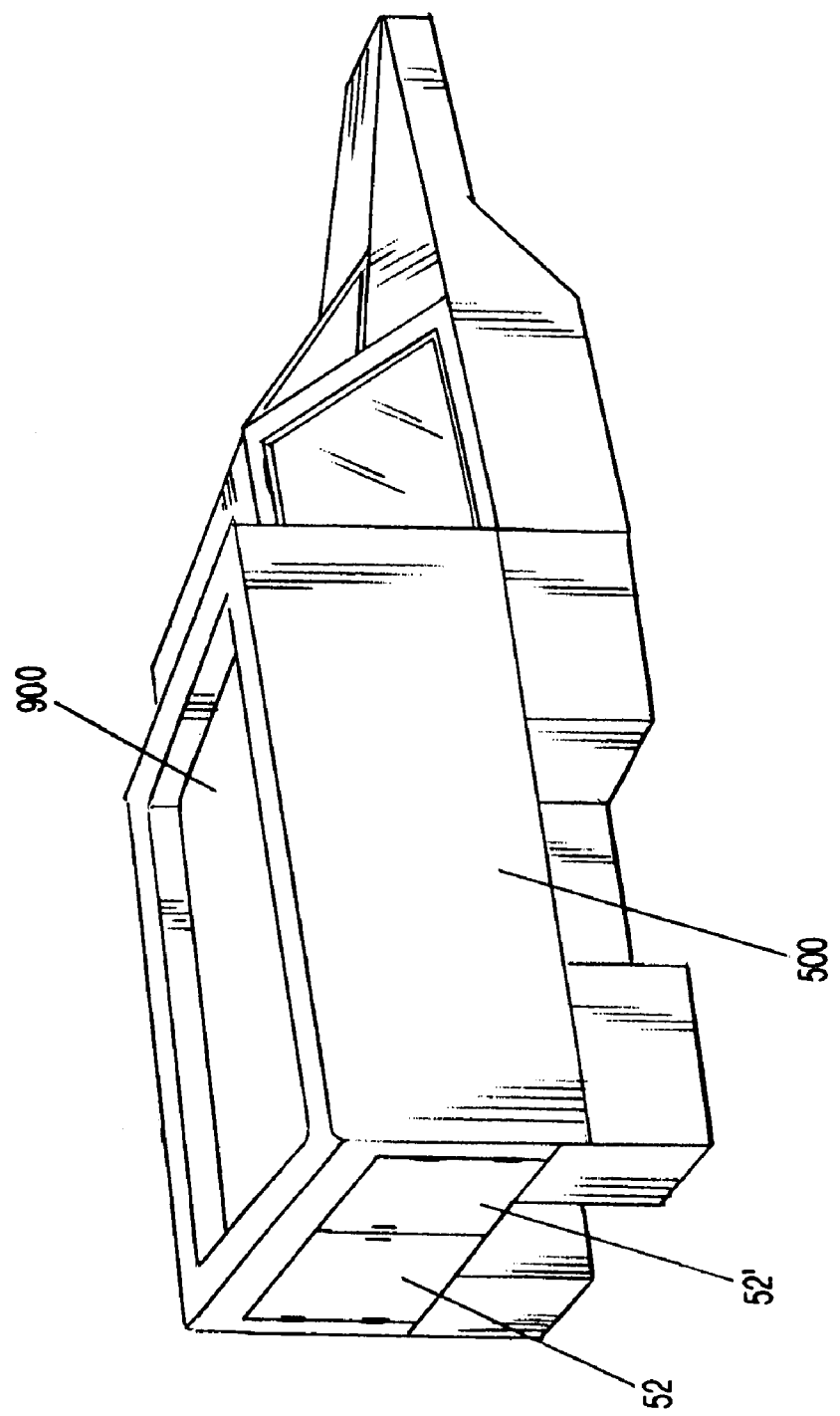
FIG. 18 shows an alternative embodiment with an aerial refill tank having refill louvers.
Figure 19A:
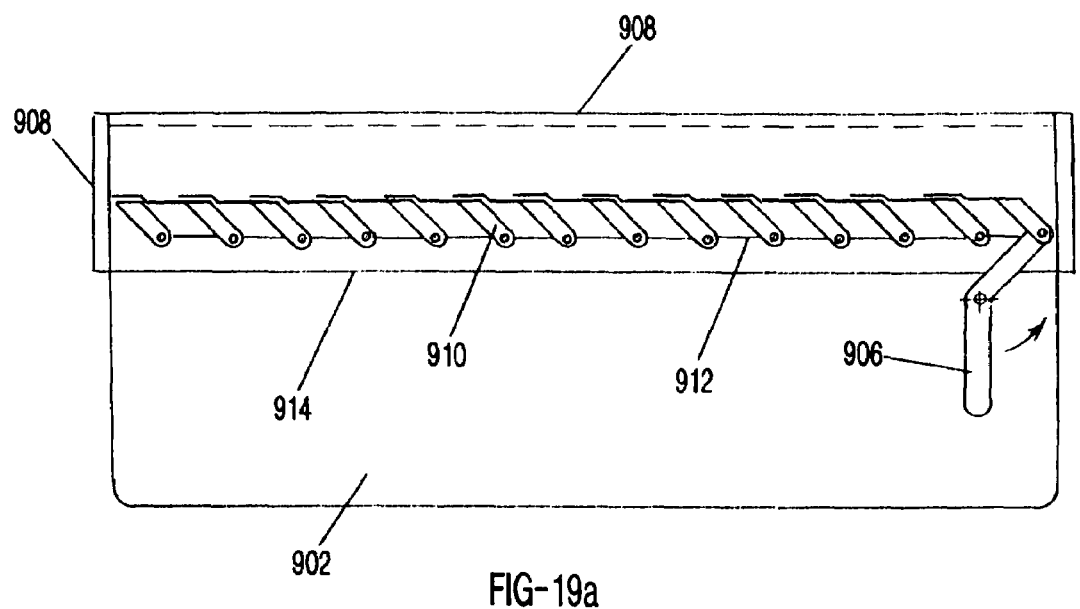
FIG. 19a shows the refill louvers of FIG. 18 in the closed position for containing fluid within the aerial refill tank.
Figure 19B:
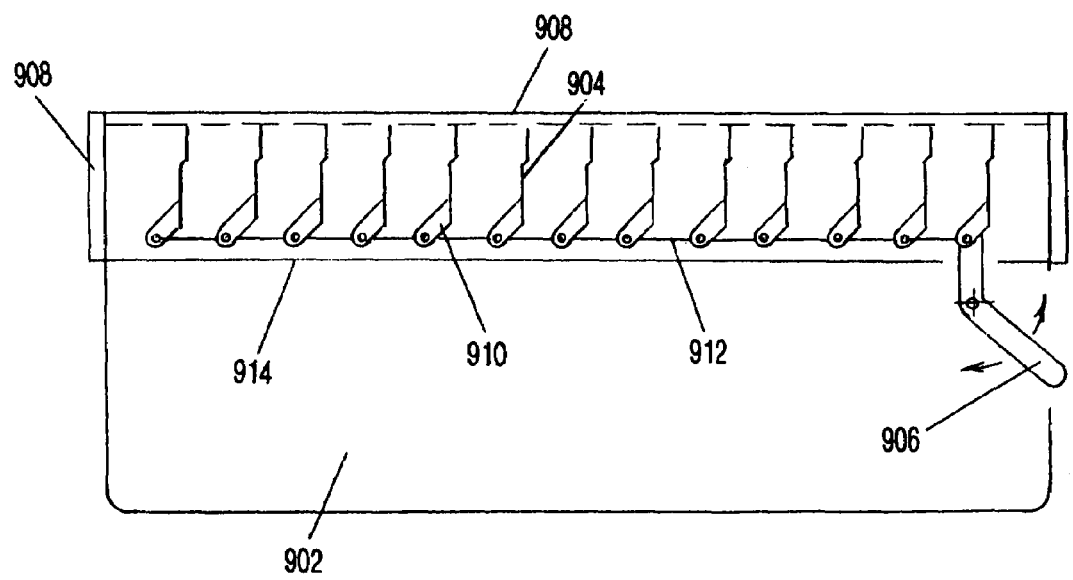
FIG. 19b shows the refill louvers of FIG. 18 in the open position for accepting fluid into the aerial refill tank.
Figure 20:
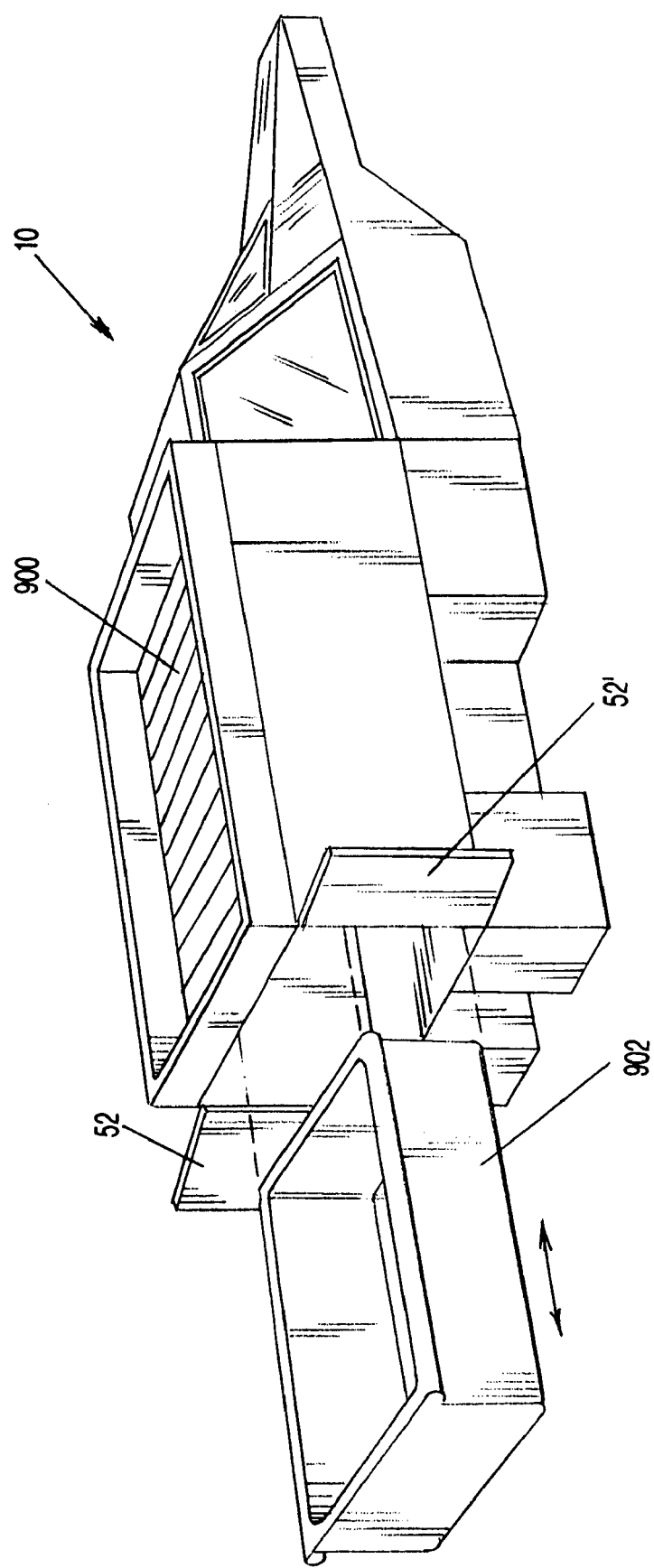
FIG. 20 shows the hinged rear doors open and the main tank slid out of the main tank containing compartment.

Referring to FIG. 18, an optional aerial refill unit 900 that can be used in place of the main overhead water tank described above is shown. Aerial refill unit 900 is structurally strong enough to withstand the impact of several hundred or a thousand pounds of water dropped onto it. Because the water is deformable, it is unlikely to impact the unit with the same direct force distribution as a potentially damaging, non-deformable solid of the same weight; thus, the vehicle and aerial refill unit 900 can safely withstand the impact of the water (or other such deformable material). Refill louvers are shown which make up the top surface of the aerial refill unit 900 of FIG. 18. In FIG. 18 and FIG. 19a, the refill louvers are shown in the closed position, thereby containing the fluid within the aerial refill unit 900. In FIG. 19b, the refill louvers are in the open position, thereby allowing water dropped from above aerial refill unit 900 to fall through the louvers and into aerial refill unit 900. When in the open position, as shown in FIG. 19b, the water that is dropped from above, for example from a helicopter, will primarily impact the bottom of the aerial refill tank 902, shown in FIG. 20. The aerial refill tank 902 slides in and out of the main overhead tank compartment that previously held an overhead water tank described above. The difference in the aerial refill tank 902 is that the top surface is completely open to receive water through the aerial refill louvers 904, seen in FIGS. 19*a* and 19*b*. In FIG. 19*a*, a handle 906 is moved (e.g., pushed) to the right in order to open the louvers 904, and in FIG. 19*b* the handle 906 is pulled to the left in order to close the louvers 904 and contains the fluid underneath in the aerial refill tank 902, shown in FIG. 20. With the refill louvers closed, the aerial refill tank 902 is also protected from the entry of debris. Because the main overhead water tank, as well as the aerial refill tank 902 is preferably made of a polyethylene plastic that cannot withstand fire or embers, it is important that the tanks be inserted into the steel tank compartment in the rear of the vehicle 10. Returning to FIGS. 19*a* and 19*b*, the handle 906 is located in the cab within easy reach of the driver. When the driver moves or pushes the handle, as shown in FIG. 19*a*, the connecting linkage members 910 and 912 cause the louvers 904 to be raised into the open vertical position shown in FIG. 19*b*. The top of the aerial refill tank that is shown generally at 914 in FIGS. 19*a* and 19*b* provides for water overflow and assures that the louvers always act freely and are not restricted by the water. After the water is placed into the tank, the driver moves or pulls the handle 906 back to close the louvers 904. In a preferred embodiment of the present invention, the structural frame of the aerial refill unit 900 shown at 908 acts both as a support framework for the louver assembly, as well as a funnel to help direct the water into aerial refill tank 902.

Figure 21:
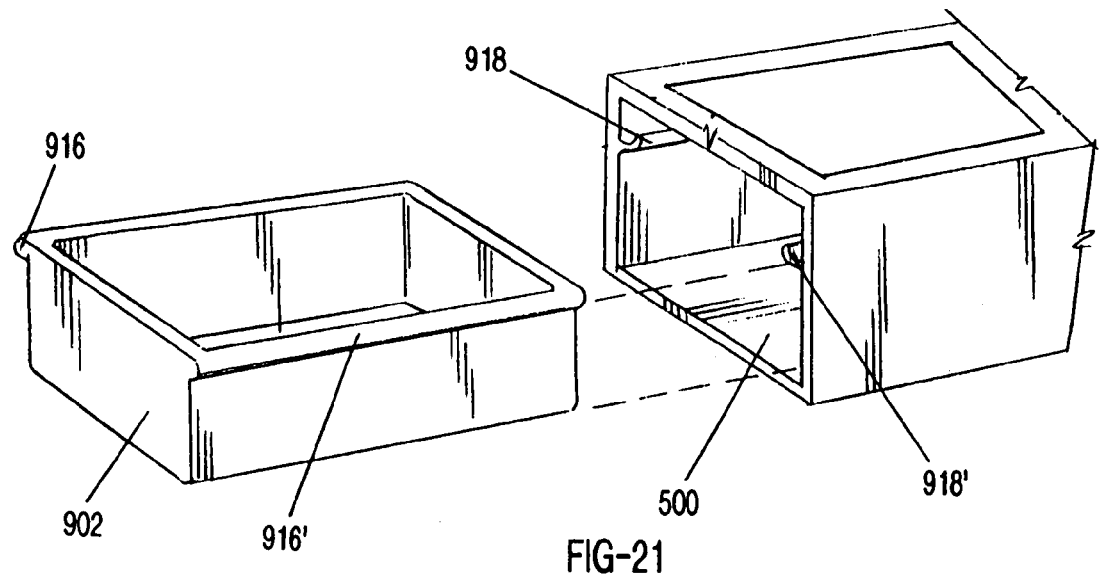
FIG. 21 shows the means by which the main tank is inserted, guided, and retained within the main tank containing compartment.
Figure 22:
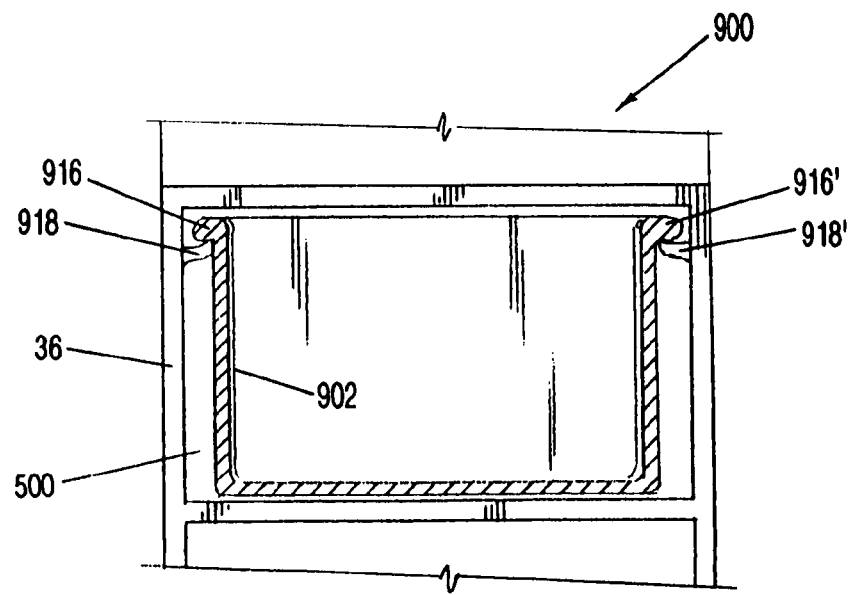
FIG. 22 shows the guide rails and guide channels in relation to the frame around the main tank containing compartment and the main tank.

FIG. 21 shows the manner in which the main overhead water tank which is stored within the main overhead tank compartment 500, and optionally comprises an aerial refill tank 902, fits into the main overhead tank compartment 500. For example, an aerial refill unit 902 is shown as it is inserted into the main overhead compartment 500. Guide rails 916, 916' which are molded into the tank, fit into guide channels 918 and 918' that are mounted within the compartment 500. The tank 902 is then manually pushed (or pushed or pulled through mechanized means) into the compartment 500, where it fits snugly on all sides. Rear doors 52 and 52', for example as shown on FIG. 2, secure the tank 902 within the compartment 500. FIG. 22 shows the tank 902 within the compartment 500 and the relationship of the guide rails 916, 916' and the guide channels 918 and 918' in relation to the compartment 500 and to the structure of the aerial refill unit 900.

Figure 23A:
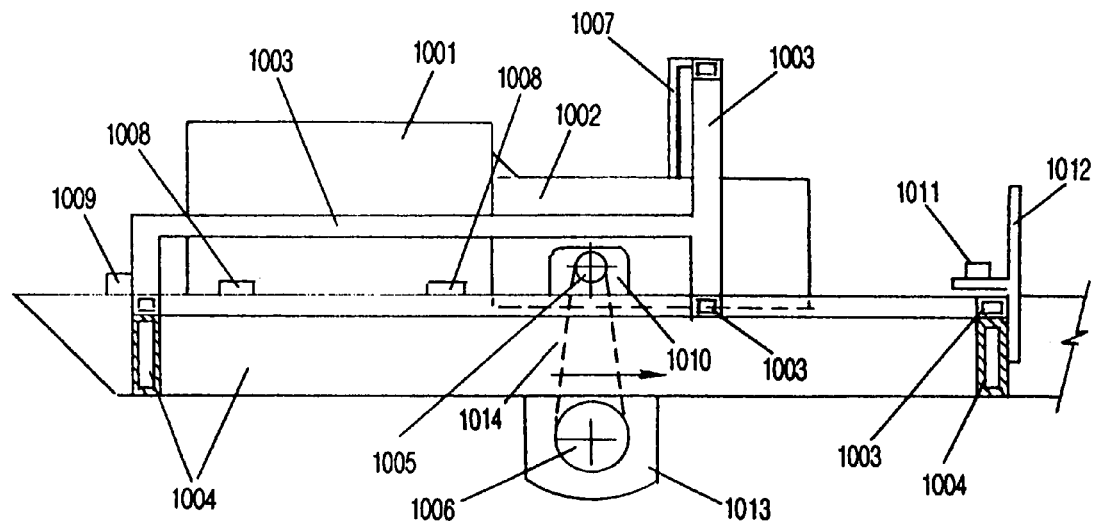
FIG. 23a is a side view of an engine cradle of a preferred embodiment of the present invention.
Figure 23B:
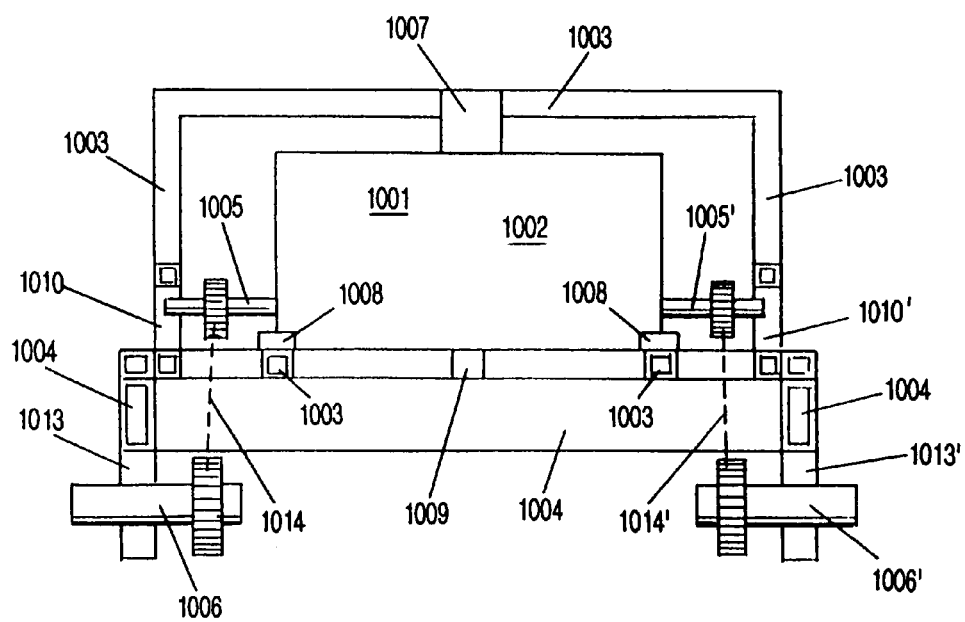
FIG. 23b is an end view of an engine cradle of a preferred embodiment of the present invention.

The slidable engine cradle is shown in FIG. 23*a* and FIG. 23*b*. Quick disconnects are provided on the chain mechanism as well as on, for example, fuel, hydraulic, pneumatic, and/or electrical systems. Once the quick disconnects are disconnected, the slidable engine cradle is slid out of the back of vehicle 10 through opened door 54. Then the damaged engine can be removed and a new one put in its place. A complete engine transmission change-out can be accomplished in approximately 20 minutes. In a preferred embodiment, when the engine comprises an air-cooled gasoline or diesel fuel engine, the use of radiators, hoses, and/or fluid leaks are eliminated and/or minimized such that the potentional for incapacitation of the vehicle is minimized.

Referring to FIGS. 23*a* and 23*b*, an engine 1001 and a transmission 1002 comprise an assembly that is mounted in an engine cradle 1003. The assembly is optionally secured through use of at least one engine mount 1008 and/or at least one transmission mount 1007. The engine cradle 1003 rests and slides on the main frame member 1004 until the cradle 1003 butts to, for example, a quick disconnect mounting and an engine cradle aligning plate 1012. When properly aligned, the engine cradle 1003 is secured to the main frame 1004 by means of a cradle lock 1009 and to the aligning plate 1012 by means of another cradle lock 1011.

Drive chains 1014, 1014' are attached to transaxles 1005, 1005' and main axles 1006, 1006'. Disconnects, for example, quick disconnects, for fuel, hydraulic, pneumatic, electrical, etc. systems mounted in or to the aligning plate 1012 are connected to matching connections on the engine 1001. Transaxles 1005, 1005' are secured to the cradle 1003 by means of, for example, pillow block bearings 1010, 1010'. The main axles 1006, 1006' are mounted to the main frame 1004 by means of the main axle housings 1013, 1013'.

Additional equipment that can be mounted upon, provided by, or enabled by vehicle 10 include auxiliary hydraulics, for example to power JAWS OF LIFE®, mowers, and hydraulic jacks. An auxiliary air compressor can supply metal saws, weed-eaters, air chisels, air chain saws, air jacks, and airbags. In order to retrieve objects, winches, wrecker booms or robotic arms can be mounted to vehicle 10. Lighting apparatuses can also be mounted to vehicle 10, such as emergency light bars, spotlights, searchlights, and work lights. Flammable gas detectors, toxic gas detectors, high temperature and explosive detectors can also be equipped on vehicle 10. Optionally, plow blades can be mounted upon the vehicle for snow or debris removal. A piercing nozzle and hook can be affixed to the vehicle. The piercing nozzle can be used to pierce, for example, a burning automobile and then to flood the interior with water or fire suppression material. Then the hook is used to drag the automobile, or other object, away so that is does not endanger nearby vehicles, structures, or objects.

In alternative embodiments, the vehicle optionally accommodates piercing nozzles, extendable tow hooks, winch assemblies and/or wrecker boom assemblies.

Another embodiment of the invention combines the wheel with the crawler embodiment and has both tracks and wheels for mobility. Communication gear that can be put into the present invention, but is optional includes radios, short waves, citizens band and handheld radios. A closed-circuit television with surveillance cameras, robotics, and intercoms with the driver to the outside crew can also be included. Roof racks can be installed for equipment. Preferably additional driver air supply is approximately two hours, comprising two one-hour air bottles. If a driver enters into a toxic smoke area or toxic fumes of any kind, then the additional air supply provides driver safety. As described above, the air supply can be manifolded so that if people have to be evacuated, they can be provided with air in the tank compartment of the vehicle.

Robotic arms and tele-operated systems can be accommodated on the vehicle. Additionally, thermal imaging scopes can be mounted in the vehicle and used in conjunction with the robotic tele-operation systems. This would allow robotic location of people in damaged buildings. In riot or crowd control situations, it could allow looters to be spotted in dark buildings.

The vehicle can also address hazardous materials applications. In these circumstances, the water tank can be emptied and then the pump reversed so that it creates a vacuum instead of a spray. At least approximately 2250 liters of hazardous material can then be pulled into the water tank. Alternatively, a, pump or other mechanism for creating a vacuum is fitted to the vehicle to accomplish the same or similar result.

Additionally, one of the two air bottles for the driver can be replaced with HALON® for electrical fires, if necessary, and due to the enclosed design of the cab, the driver remains safe.

INDUSTRIAL APPLICABILITY

The invention is further illustrated by the following non-limiting examples. Applications for the emergency response vehicle include personal residences, particularly those that are of large acreage or those that are hard to access by the nearest fire department. National and state parks and forest areas, fire departments, police departments, island communities, industrial facilities, gated communities, the Federal Emergency Management Administration (FEMA), military installations, can all benefit from having this basic piece of equipment. Malls and parking garages are currently inaccessible to most fire fighting vehicles, but the present invention can fit easily into these structures. Having quick access to fire fighting equipment can prevent catastrophic losses and tremendously reduce costs.

Typically, communities having population of less than 1,500 persons normally cannot afford a standard fire truck, ranging from approximately $400,000 to $750,000. Additionally these fire trucks, such as pumper trucks, require four trained professionals to operate. In areas where there are beaches, islands and lakes, normally fire trucks are not available because they are too large. Stockyards, lumber mills, and cotton gins need fire protection, but they need something less expensive than the conventional fire truck, and they need something that can be operated by one person.

For facilities valued at above two million dollars, such as estates, homes, ranches, farms, commercial warehouses, shopping centers, port and dock facilities where conventional fire trucks cannot go, and for refineries, offshore rigs and Navy aircraft carriers, this vehicle is ideal. The vehicle also provides access to mines because of its small size. There currently is not water-borne fire protection for marinas in the U.S. Therefore this vehicle mounted on a hovercraft (or optionally reconfigured for amphibious operation) could very easily access many boats. Of course, a more extreme configuration comprises features for implementing flight of the apparatus. For example, a vehicle structure comprising wings and/or at least one propeller would help to facilitate flight.

The water tank can instead be filled with liquid fertilizer, and spray bars used to fertilize crops or golf courses. Mowers can also be attached to the vehicle both for use in emergency situations or for off-time use to care for a golf course. For example, a single vehicle is optionally equipped with chemicals, water and/or tools for managing greens, sand traps, fairways, tees, and/or other specific areas of a golf course. When not in use for managing grounds, the vehicle is available for emergency support during foul weather, illness, and/or feeding hungry workers and/or golfers. No strike devices for eliminating or dissipating lightening strikes are optionally mountable to the vehicle.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A fire-fighting emergency response vehicle comprising:
   a triangular wheel base comprising a front wheel and two opposing rear wheels;
   at least one emergency response fluid delivery tank comprising a main tank, said main tank further comprising guide rails for mating with guide channels upon said vehicle such that said main tank is slidably removable from said vehicle;
   a vehicle engine; and
   a path clearing, wedge-shaped nose for maneuvering about obstacles, said nose comprising two or more sides angled in a wedge towards each other at a point at a front of said nose, at least two of said sides being lateral sides of the vehicle; and
   said vehicle comprising dimensions of less than or equal to 4.5 meters in length, 1.5 meters in width, and 2 meters in height.

2. The vehicle of claim 1 wherein said at least one fluid delivery tank comprises at least one modular auxiliary tank.

3. The vehicle of claim 1 further comprising at least one window resistant to fire.

4. The vehicle of claim 1 further comprising a chain and sprocket steering mechanism.

5. The vehicle of claim 1 wherein said front wheel comprises a 360 degree rotatability for translational movement of said vehicle.

6. The vehicle of claim 1 further comprising engine quick disconnects and wherein said engine is mounted upon a slidable engine cradle for sliding said engine out of said vehicle to facilitate maintenance and replacement.

7. The vehicle of claim 1 further comprising at least one device selected from the group consisting of a tilt-bed, a gimbal, a basket and a robotic arm.

8. The vehicle of claim 1 wherein said tank is capable of delivering a component capable of forming at least approximately 34,000 liters of fire-suppressing foam.

9. The vehicle of claim 1 further comprising a rigid frame for withstanding impacts with obstacles in the path of said vehicle.

10. The vehicle of claim 1 further comprising at least one attachment point located on said vehicle for airlifting and airdropping said vehicle via helicopter or parachute.

11. The vehicle of claim 1 further comprising runflat tires located upon at least one of said wheels of said wheel base.

12. The vehicle of claim 1 further comprising left and right brakes wherein said brakes comprise separate controllability.

13. The vehicle of claim 1 wherein said wedge-shaped nose is disposed atop said front wheel of said triangular wheel base.

14. The vehicle of claim 1 wherein said wedge-shaped nose is a ram.

15. The vehicle of claim 1 having a weight of less than or equal to approximately 1300 kilograms when empty.

16. The vehicle of claim 1 further comprising a driver's compartment.

17. A fire-fighting emergency response vehicle comprising:
   a triangular wheel base comprising a front wheel and two opposing rear wheels wherein said front wheel comprises a 360° rotatability for translational movement of said vehicle;

at least one emergency response fluid delivery tank;
a vehicle engine; and
a path clearing, wedge-shaped nose for maneuvering about obstacles, said nose comprising two or more sides angled in a wedge towards each other at a point at a front of said nose, at least two of said sides being lateral sides of the vehicle.

18. The vehicle of claim 17 wherein said at least one fluid delivery tank comprises a main tank, said main tank further comprising guide rails for mating with guide channels upon said vehicle such that said main tank is slidably removable from the vehicle.

19. The vehicle of claim 17 wherein said at least one fluid delivery tank comprises at least one modular auxiliary tank.

20. The vehicle of claim 17 further comprising at least one window resistant to fire.

21. The vehicle of claim 17 further comprising a chain and sprocket steering mechanism.

22. The vehicle of claim 17 further comprising engine quick disconnects and wherein said engine is mounted upon a slidable engine cradle for sliding said engine out of said vehicle to facilitate maintenance and replacement.

23. The vehicle of claim 17 further comprising at least one device selected from the group consisting of a tilt-bed, a gimbal, a basket and a robotic arm.

24. The vehicle of claim 17 wherein said tank is capable of delivering a component capable of forming at least approximately 34,000 liters of fire-suppressing foam.

25. The vehicle of claim 17 further comprising a rigid frame for withstanding impacts with obstacles in the path of said vehicle.

26. The vehicle of claim 17 further comprising at least one attachment point located on said vehicle for airlifting and airdropping said vehicle via helicopter or parachute.

27. The vehicle of claim 17 further comprising runflat tires located upon at least one of said wheels of said wheel base.

28. The vehicle of claim 17 further comprising left and right brakes wherein said brakes comprise separate controllability.

29. The vehicle of claim 17 wherein said wedge-shaped nose is disposed atop said front wheel of said triangular wheel base.

30. The vehicle of claim 17 wherein said wedge-shaped nose is a ram.

31. The vehicle of claim 17 having a weight of less than or equal to approximately 1300 kilograms when empty.

32. The vehicle of claim 17 further comprising a driver's compartment.

33. A fire-fighting emergency response vehicle comprising:
a triangular wheel base comprising a front wheel and two opposing rear wheels;
at least one emergency response fluid delivery tank;
a vehicle engine;
left and right brakes wherein said brakes comprise separate controllability; and
a path clearing, wedge-shaped nose for maneuvering about obstacles, said nose comprising two or more sides angled in a wedge towards each other at a point at a front of said nose, at least two of said sides being lateral sides of the vehicle.

34. The vehicle of claim 33 wherein said at least one fluid delivery tank comprises a main tank, said main tank further comprising guide rails for mating with guide channels upon said vehicle such that said main tank is slidably removable from the vehicle.

35. The vehicle of claim 33 wherein said at least one fluid delivery tank comprises at least one modular auxiliary tank.

36. The vehicle of claim 33 further comprising at least one window resistant to fire.

37. The vehicle of claim 33 further comprising a chain and sprocket steering mechanism.

38. The vehicle of claim 33 wherein said vehicle comprises dimensions of less than or equal to 4.5 meters in length, 1.5 meters in width, and 2 meters in height.

39. The vehicle of claim 33 wherein said front wheel comprises a 360 degree rotatability for translational movement of said vehicle.

40. The vehicle of claim 33 further comprising engine quick disconnects and wherein said engine is mounted upon a slidable engine cradle for sliding said engine out of said vehicle to facilitate maintenance and replacement.

41. The vehicle of claim 33 further comprising at least one device selected from the group consisting of a tilt-bed, a gimbal, a basket and a robotic arm.

42. The vehicle of claim 33 wherein said tank is capable of delivering a component capable of forming at least approximately 34,000 liters of fire-suppressing foam.

43. The vehicle of claim 33 further comprising a rigid frame for withstanding impacts with obstacles in the path of said vehicle.

44. The vehicle of claim 33 further comprising at least one attachment point located on said vehicle for airlifting and airdropping said vehicle via helicopter or parachute.

45. The vehicle of claim 33 further comprising runflat tires located upon at least one of said wheels of said wheel base.

46. The vehicle of claim 33 wherein said wedge-shaped nose is disposed atop said front wheel of said triangular wheel base.

47. The vehicle of claim 33 wherein said wedge-shaped nose is a ram.

48. The vehicle of claim 33 having a weight of less than or equal to approximately 1300 kilograms when empty.

49. The vehicle of claim 33 further comprising a driver's compartment.

50. A fire-fighting emergency response vehicle comprising:
a triangular wheel base comprising a front wheel and two opposing rear wheels;
at least one emergency response fluid delivery tank comprising a main tank, said main tank further comprising guide rails for mating with guide channels upon said vehicle such that said main tank is slidably removable from the vehicle;
a vehicle engine; and
a path clearing, wedge-shaped nose for maneuvering about obstacles, said nose comprising two or more sides angled in a wedge towards each other at a point at a front of said nose, at least two of said sides being lateral sides of the vehicle.

51. The vehicle of claim 50 wherein said at least one fluid delivery tank comprises at least one modular auxiliary tank.

52. The vehicle of claim 50 further comprising at least one window resistant to fire.

53. The vehicle of claim 50 further comprising a chain and sprocket steering mechanism.

54. The vehicle of claim 50 wherein said vehicle comprises dimensions of less than or equal to 4.5 meters in length, 1.5 meters in width, and 2 meters in height.

55. The vehicle of claim 50 wherein said front wheel system comprises a 360 degree rotatability for translational movement of said vehicle.

56. The vehicle of claim 50 further comprising engine quick disconnects and wherein said engine is mounted upon a slidable engine cradle for sliding said engine out of said vehicle to facilitate maintenance and replacement.

57. The vehicle of claim 50 further comprising at least one device selected from the group consisting of a tilt-bed, a gimbal, a basket and a robotic arm.

58. The vehicle of claim 50 wherein said tank is capable of delivering a component capable of forming at least approximately 34,000 liters of fire-suppressing foam.

59. The vehicle of claim 50 further comprising a rigid frame for withstanding impacts with obstacles in the path of said vehicle.

60. The vehicle of claim 50 further comprising at least one attachment point located on said vehicle for airlifting and airdropping said vehicle via helicopter or parachute.

61. The vehicle of claim 50 further comprising runflat tires located upon at least one of said wheels of said wheel base.

62. The vehicle of claim 50 further comprising left and right brakes wherein said brakes comprise separate controllability.

63. The vehicle of claim 50 wherein said wedge-shaped nose is disposed atop said front wheel of said triangular wheel base.

64. The vehicle of claim 50 wherein said wedge-shaped nose is a ram.

65. The vehicle of claim 50 having a weight of less than or equal to approximately 1300 kilograms when empty.

66. The vehicle of claim 50 further comprising a driver's compartment.

* * * * *